US010708853B2

(12) United States Patent
Bendlin et al.

(10) Patent No.: US 10,708,853 B2
(45) Date of Patent: Jul. 7, 2020

(54) LOW OVERHEAD SYSTEM INFORMATION ACQUISITION FOR WIRELESS COMMUNICATION

(71) Applicants: INTEL IP CORPORATION, Santa Clara, CA (US); Ralf Bendlin, Portland, OR (US); Jong-Kae Fwu, Sunnyvale, CA (US); Yujian Zhang, Beijing (CN)

(72) Inventors: Ralf Bendlin, Portland, OR (US); Gang Xiong, Portland, OR (US); Jong-Kae Fwu, Sunnyvale, CA (US); Yujian Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 15/571,332

(22) PCT Filed: Dec. 24, 2015

(86) PCT No.: PCT/IB2015/002621
§ 371 (c)(1),
(2) Date: Nov. 2, 2017

(87) PCT Pub. No.: WO2016/198909
PCT Pub. Date: Dec. 15, 2016

(65) Prior Publication Data
US 2018/0288683 A1    Oct. 4, 2018

Related U.S. Application Data

(60) Provisional application No. 62/174,140, filed on Jun. 11, 2015.

(51) Int. Cl.
*H04W 4/00* (2018.01)
*H04W 48/14* (2009.01)
(Continued)

(52) U.S. Cl.
CPC ........... *H04W 48/14* (2013.01); *H04W 48/10* (2013.01); *H04W 48/16* (2013.01); *H04W 74/006* (2013.01)

(58) Field of Classification Search
CPC ...... H04W 48/14; H04W 48/10; H04W 48/16
See application file for complete search history.

(56) References Cited

U.S. PATENT DOCUMENTS

2010/0027466 A1 * 2/2010 Mustapha ............. H04W 48/14
                                                    370/328
2011/0263252 A1 * 10/2011 Saini ..................... H04W 48/16
                                                    455/434

(Continued)

FOREIGN PATENT DOCUMENTS

CN         102595481 A      7/2012
WO       2008044664 A1      4/2008

(Continued)

OTHER PUBLICATIONS

International Search Report and Written Opinion for International PCT Application PCT/IB2015/002621 filed Dec. 24, 2015; dated Jun. 9, 2016, 9 pages.

*Primary Examiner* — Abdelnabi O Musa
(74) *Attorney, Agent, or Firm* — Eschweiler & Potashnik, LLC

(57) ABSTRACT

A method for low overhead system information acquisition (LOSIA) is disclosed. The LOSIA method includes several techniques for transmitting common channels in a next generation Radio Access Technology (xRAT). Instead of transmitting system information in a periodic, static, cell-specific, wideband manner, the transmission is triggered by user equipment in an "on demand" manner. The LOSIA method allows the network to control the overhead, bandwidth, and periodicity, as well as other characteristics. The LOSIA method employs several different techniques to (Continued)

trigger the information upon which the network can act, for example, by transmitting different payloads depending on the received trigger.

23 Claims, 15 Drawing Sheets

(51) Int. Cl.
*H04W 48/10* (2009.01)
*H04W 48/16* (2009.01)
*H04W 74/00* (2009.01)

(56) References Cited

U.S. PATENT DOCUMENTS

| | | | | |
|---|---|---|---|---|
| 2012/0163305 A1* | 6/2012 | Nimbalker | ........ | H04W 52/0206 |
| | | | | 370/329 |
| 2013/0077582 A1* | 3/2013 | Kim | .................... | H04W 74/006 |
| | | | | 370/329 |
| 2013/0089008 A1* | 4/2013 | Li | .......................... | H01Q 1/246 |
| | | | | 370/277 |
| 2014/0315549 A1* | 10/2014 | Zhang | .................. | H04W 48/08 |
| | | | | 455/434 |
| 2015/0373626 A1* | 12/2015 | Yi | ........................ | H04W 48/20 |
| | | | | 375/132 |

FOREIGN PATENT DOCUMENTS

| | | |
|---|---|---|
| WO | 2008084949 A1 | 7/2008 |
| WO | 2012/155693 A1 | 11/2012 |

* cited by examiner

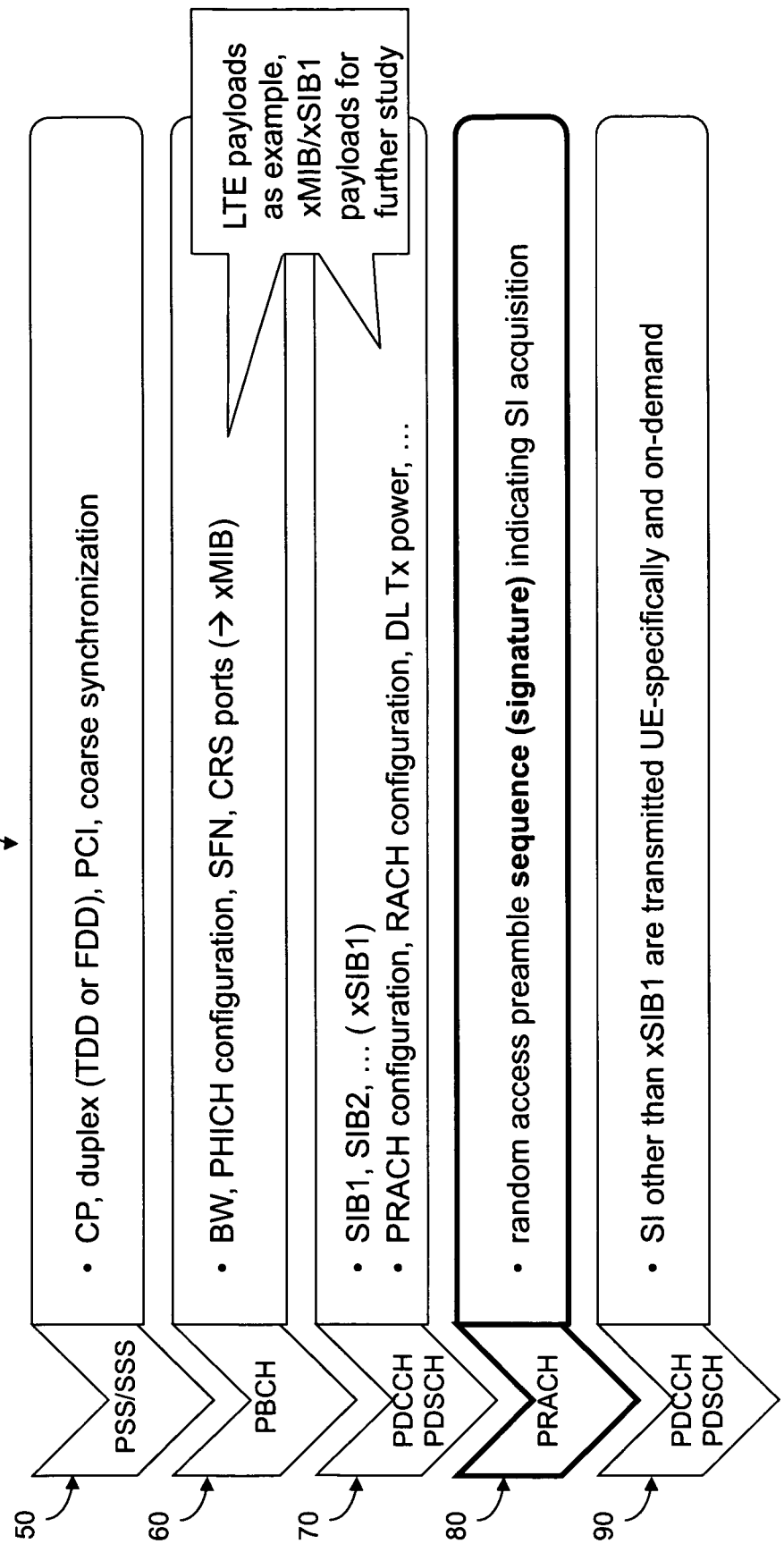

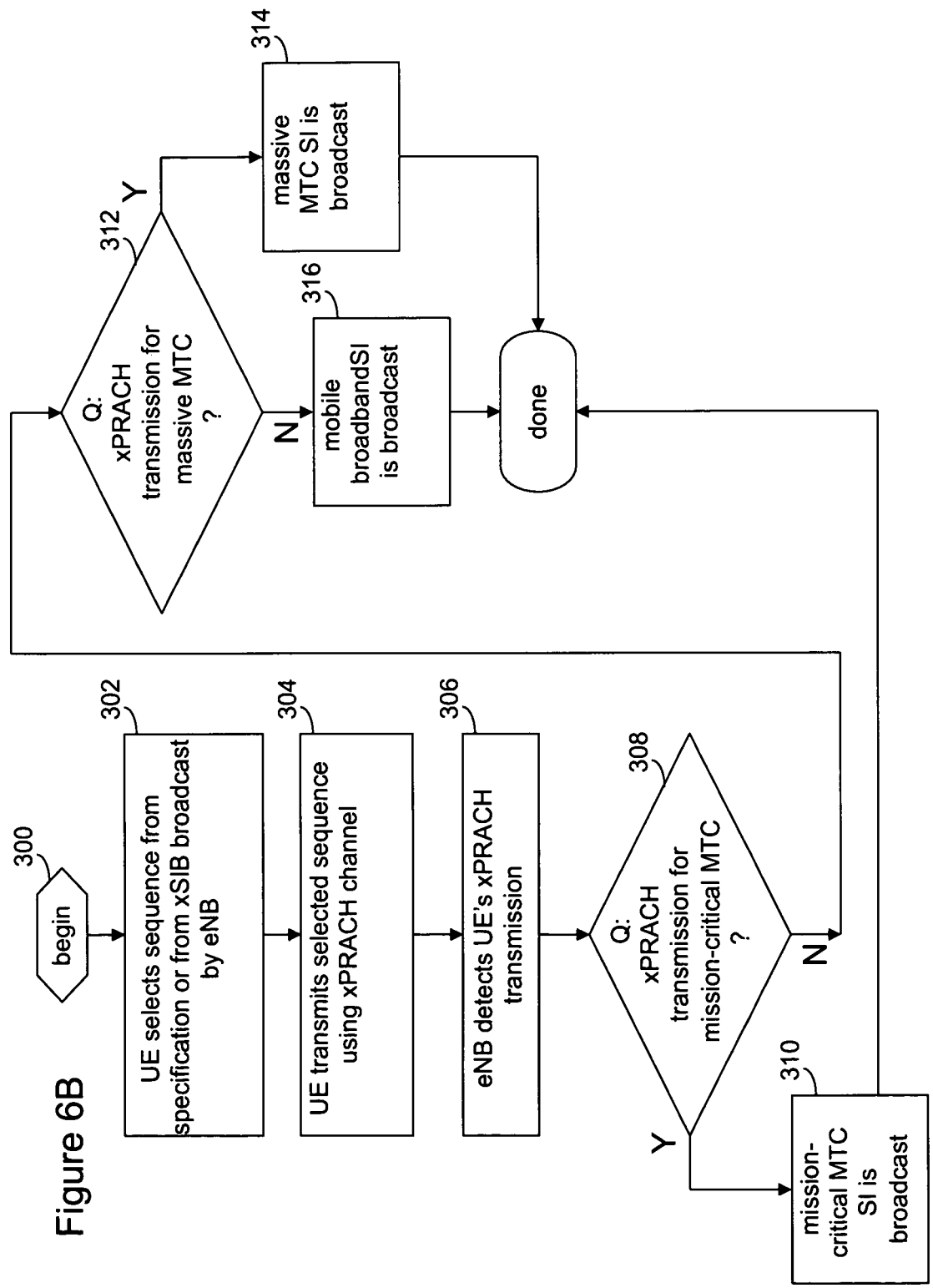

LOW OVERHEAD SYSTEM INFORMATION ACQUISITION FOR WIRELESS COMMUNICATION

CROSS-REFERENCE TO RELATED APPLICATIONS

This application claims priority to U.S. Provisional Patent Application No. 62/174,140, filed on Jun. 11, 2015, and to Patent Cooperation Treaty Application Number PCT/IB2015/002621, filed on Dec. 24, 2015, both of which are incorporated herein by reference in their entirety.

TECHNICAL FIELD

This application relates to the provision of system information (SI) to a user equipment (UE) implementing wireless communications technology.

BACKGROUND

In the 3$^{rd}$ Generation Partnership Project (3GPP) Long-Term Evolution (LTE) fourth generation mobile communication standard, base stations, so-called enhanced NodeBs or eNodeBs (eNBs), schedule the transmissions of common channels in the physical layer (PHY) via the cell-specific periodic wideband Physical Downlink Control Channel (PDCCH). In addition, the reference signals, with which user equipment (UE) can demodulate the PDCCH, are also transmitted in a cell-specific periodic wideband fashion.

Previous studies to enhance the LTE Advanced (LTE-A) communications standard have focused on lean reference signal design. For example, in LTE Release 11, a standalone New Carrier Type (NCT) for Primary Cells (PCells) was proposed but not adopted. In the subsequent Release 12, small cell enhancements were introduced which allow small cell eNBs to turn on and off their transceiver circuitry depending on the traffic load. However, these enhancements only apply to Secondary Cells (SCells), whereas UEs are not allowed to camp on such cells operating in small cell on/off mode. In fact, there is no lean carrier waveform in LTE-A. Instead, for LTE-A, overhead is controlled by switching between no transmission and transmission of legacy waveforms, i.e., those standardized since LTE Release 8.

For example, a PCell can slowly ramp down its transmit power to simulate the effect of mobility at the UE, thus triggering a handover to an adjacent cell. Once all the UEs are handed off from the respective PCell, the eNB can turn off its radio front-end, resulting in the desired energy savings and interference reductions, namely, spectral efficiency enhancements. Moreover, the eNB turning off the PCell can use the X2 Application Protocol (X2AP), used on the X2 interface connecting eNBs, to communicate to other eNBs the reason for turning off the PCell in question. This ensures that ping-pong effects are avoided, for example, the event in which an adjacent eNB tries to hand over a UE back to the PCell that is to be turned off. This allows eNBs to turn cells on and off, and subsequently, to turn their RF circuitry on and off. Nevertheless, when the PCell is active (namely, not in energy savings mode), a properly operating eNB transmits Release 8 wideband, periodic, cell-specific waveforms for backward compatibility reasons.

For SCells, LTE Release 12 provisions a more dynamic scheme which uses Release 10 Carrier Aggregation (CA) procedures to (de)activate SCells based on the short-term traffic load in the Medium Access Control (MAC) layer buffer of the eNB. For a deactivated SCell, the eNB only sends Discovery Reference Signals (DRS). Further, the eNB can control the transmission bandwidth and periodicity of the DRS using the Radio Resource Control (RRC) protocol. However, similar to the previous example, when the SCell is activated, proper eNB operation dictates that Release 8 wideband, periodic, cell-specific waveforms are transmitted for backward compatibility.

Thus, a method is desired in which system information can be obtained by the user equipment in a manner that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 2 is an illustration in which the LOSIA method of FIG. 1 triggers "on demand" system information transmission, according to some embodiments;

FIGS. 6A and 6B are illustrations of a fourth embodiment of the LOSIA method of FIG. 1, according to some embodiments;

DETAILED DESCRIPTION

In accordance with the embodiments described herein, a method for low overhead system information acquisition (LOSIA) is disclosed. The LOSIA method includes several techniques for transmitting common channels in a next generation Radio Access Technology (xRAT). Instead of transmitting system information in a periodic, static, cell-specific, wideband manner, the transmission is triggered by user equipment in an "on demand" manner. The LOSIA method allows the network to control the overhead, bandwidth, and periodicity, as well as other characteristics. The LOSIA method employs several different techniques to trigger the information upon which the network can act, for example, by transmitting different payloads depending on the received trigger.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

For the next generation of wireless communications standards, a flexible physical layer (PHY) air interface is envisioned in which common channels are transmitted with flexible bandwidth, low overhead, and dynamic periodicity. Further, for a next generation lean flexible radio access technology (RAT), low overhead primary cell (PCell) deployments ought to be possible by avoiding wideband, periodic transmissions to the utmost extent. Such enhancements are not only desirable from an energy savings and spectral efficiency standpoint, but also to enable new features such as flexible bandwidth or flexible duplex deployments currently prohibited by the wideband, periodic nature of Long-Term Evolution Advanced (LTE-A) waveforms. As described in more detail below, the LOSIA method exploits these next generation enhancements to the wireless communication standards.

Figure 1:
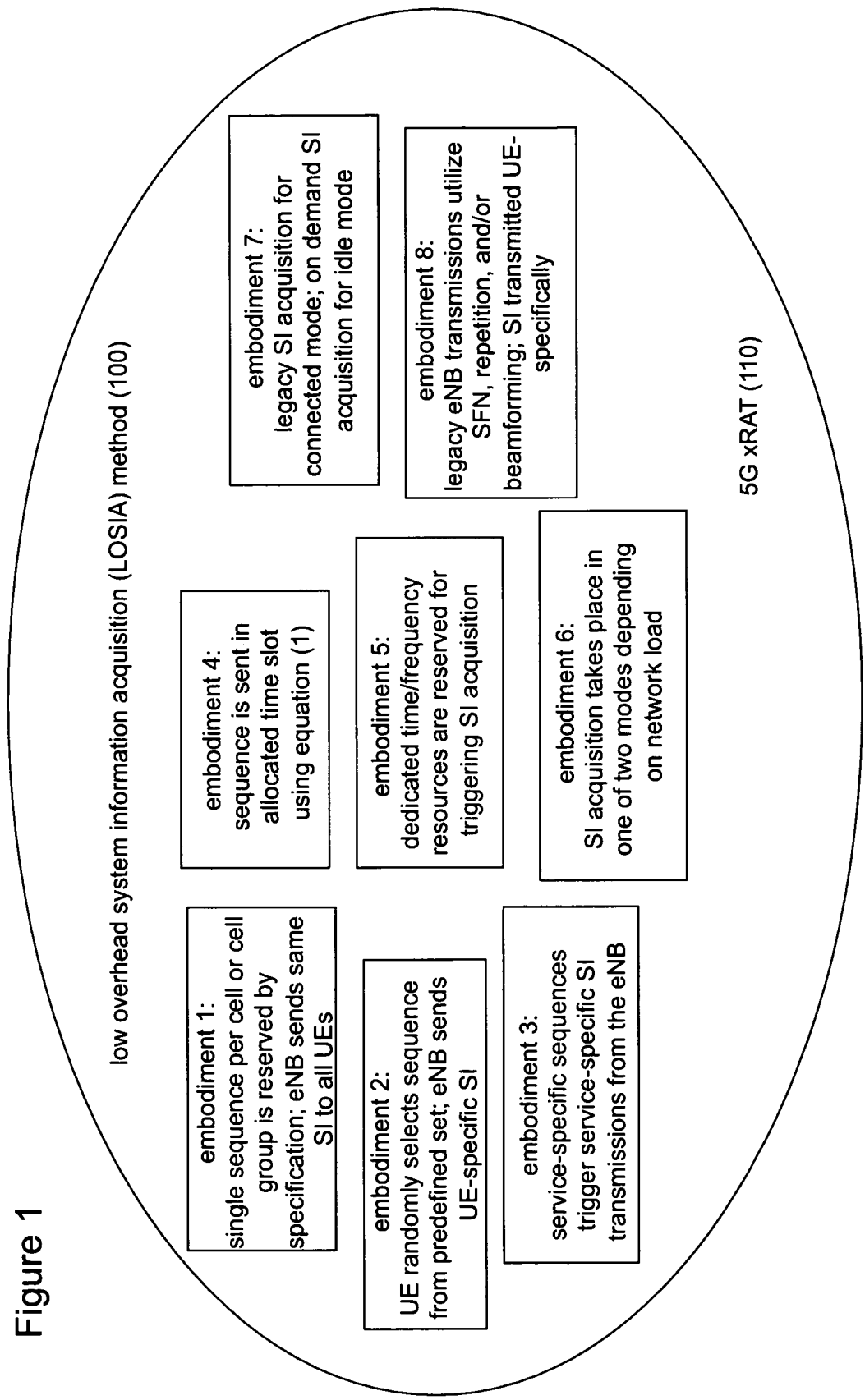
FIG. 1 is a simplified block diagram of a low overhead system information acquisition (LOSIA) method, according to some embodiments.

FIG. 1 is a simplified block diagram of a low overhead system information acquisition (LOSIA) method 100, according to some embodiments. The LOSIA method 100 works by allowing the user equipment (UE) to send a random access preamble signature that prompts the base station, or enhanced NodeB (eNodeB/eNB), to transmit system information "on demand" rather than in a periodic, static, cell-specific, wideband manner, as is done under LTE and LTE-A.

Nomenclature

The LOSIA method 100 as described herein, operates in a wireless network. In other embodiments, the LOSIA method 100 operates in a wireless cellular network. In still other embodiments, the LOSIA method operates in a novel fifth generation Radio Access Technology (5G RAT). For ease of exposition, throughout this disclosure, channels, signals, and information elements prefixed with an "x" denote the corresponding counterpart in LTE modified for the 5G RAT, which will itself be referred to herein as xRAT. Thus, for example, the Physical Downlink Shared Channel, denoted PDSCH, is referred to for the xRAT as xPDSCH. Similarly, the DeModulation Reference Signal (DMRS) is denoted herein as xDMRS, the Master Information Block (MIB) is denoted as xMIB, and so on. No assumptions on the design of channels, signals, and information elements prefixed with an "x" are made; rather the analogy ought to be understood conceptually. SS, DRS, TRS, CSI-RS, and CSI-IM denote the Synchronization Signal, Discovery Reference Signal, Tracking Reference Signal, Channel State Information Reference Signal, and the Channel State Information Interference Measurement resource, respectively. For LTE, Cell-Specific Reference Signal (CRS) and TRS are used interchangeably.

Under the LOSIA method 100, the UE receives from the eNB a minimal set of system information 60, 70, as described in FIG. 2, below. This system information allows the UE to transmit a trigger, for example, an enhanced Physical Random Access Channel (xPRACH) 80. Upon reception of the xPRACH trigger, the eNB sends additional system information 90. The xPRACH can trigger different kinds of such additional system information.

Within the LOSIA method 100, several schemes are proposed with various degrees of overhead, as described in more detail below. In some embodiments, each scheme within the LOSIA method 100 may vary in robustness, complexity, latency, and capacity, as compared to another scheme.

In the current LTE-Advanced (LTE-A) communications standard, system information transmission is periodic and wideband, and is transmitted independently of the system load. In contrast, under the LOSIA method 100, by allowing the user equipment to trigger transmission of the system information, energy savings and interference reduction, and hence improved spectral efficiency are achieved, in some embodiments. Moreover, the benefits of the LOSIA method 100 vary for certain applications and deployments as detailed herein, for example, for millimeter-wave spectrum, Device-to-Device (D2D) communications, or Machine-Type Communications (MTC). The LOSIA method 100 thus fulfills the vision of a flexible next generation radio access technology (xRAT), by specifying a means of transmitting common channels in an efficient and flexible manner as proposed herein.

Synopsis of the LOSIA Method 100

The LTE common channel design relies on cell-specific, periodic, wideband, carrier aggregation (CA) and load-agnostic mechanisms. These contradict the flexible PHY air interface design paradigm for fifth generation networks. When the UE is already aware of the radio access network (RAN) from xSS/xDRS transmissions from an eNB, the LOSIA method 100 proposes techniques to transmit all system information (SI) beyond those enabling an xPRACH transmission "on demand" based on a trigger sent by user equipment, namely, the xPRACH. In addition to obtaining system information, which is the subject of the LOSIA method 100, the xPRACH channel is also used by the UE for uplink synchronization, to make a scheduling request, to make an RRC connection setup request, and to perform other tasks. The LOSIA method 100 thus enhances its use for triggering system information transmission as well.

FIG. 2 depicts steps performed by the LOSIA method 100, in which system information transmission is triggered "on demand," according to some embodiments. The steps are described as five steps, denoted 50, 60, 70, 80, and 90, performed by the eNB or the UE, as indicated. It is to be understood, however, that these steps may each include multiple steps or operations. On the left side of each step, the channels (also known as signals or waveforms) being used to perform the LOSIA method 100 are indicated, with these channels merely being provided as examples. The fourth step, step 80, is distinguished from the other steps because steps 50, 60, 70, and 90 are downlink transmissions from the eNB over the air while step 80 is an uplink transmission from the UE to the eNB.

Continuing to use LTE as an example, when first attempting to attach to a radio access network (RAN), the UE performs a cell search operation. During the cell search, the UE obtains minimum system information (SI) necessary to access the network. Then, the UE performs what is known as a random access procedure by transmitting a preamble sequence (also called a "signature") to establish a radio link with the eNB. In addition to acquiring necessary uplink timing information before UL and DL transmissions can take place, the UE also obtains a unique identifier during the random access procedure.

Further, the following LTE physical layer channels, which occupy the transmission band of the air interface between the eNB and the UE, are described. The Physical Broadcast Channel (PBCH) includes part of the SI used by the UE to access the network, namely, the Master Information Block (MIB). The Physical Hybrid Automatic Request (HARQ) Indicator Channel (PHICH) is used for retransmission messaging. Before receiving the Physical Downlink Control Channel (PDCCH), the UE obtains the PHICH configuration (cf. FIG. 2, 60). The PDCCH is, in turn, obtained both before reception of the Physical Downlink Shared Channel (PDSCH) from the eNB and for scheduling grants that enable the UE to transmit to the eNB using the Physical Uplink Shared Channel (PUSCH). The PDSCH and PUSCH are the main transmission channels used for data transmission between the UE and the eNB. The Physical Random Access Channel (PRACH) is used for random access by the UE. Transport channels in the MAC layer map to the above physical channels. Physical channels that do not correspond to a transport channel are used, among others, for Downlink Control Information (DCI) providing the UE with information to decode DL and/or UL transmissions. Primary and secondary synchronization signals (PSS/SSS) are continuously transmitted on the air interface and are thus always available for a UE, e.g., to perform cell search or radio resource management (RRM).

Referring to FIG. 2, in the step 50, which is the initial cell search, the UE first obtains coarse time and frequency synchronization from the PSS/SSS. PSS/SSS transmissions from the eNB also indicate the cyclic prefix (CP) length, the duplex mode, and the Physical Cell ID (PCI) of the cell. The duplex mode indicates whether the eNB uses time domain duplexing (TDD) or frequency domain duplexing (FDD), while the PCI is a physical layer identifier associated with the cell of the eNB. The coarse time/frequency synchronization allows the UE to synchronize its clock with that of the eNB. These downlink transactions 50 enable the UE to synchronize with the network and to decode subsequent downlink transmissions on physical downlink channels.

Most essential system information including the DL cell bandwidth, the PHICH configuration of the cell, and the System Frame Number (SFN) are transmitted on the PBCH. In FIG. 2, these items are shown as being part of the xMIB in step 60.

Once PSS/SSS are correctly detected, the UE is able to decode the PBCH. Minimal system information is then accessible to the UE from the PBCH. In LTE, there are two ways system information is delivered to the UE. First, there is a limited amount of system information known as a Master Information Block (MIB), which is conveyed via the PBCH. In the step 60, LTE payloads for the PBCH are shown. The UE decodes the PBCH to acquire the system bandwidth (BW), the PHICH configuration, the System Frame Number (SFN), and the number of Cell-specific Reference Signal (CRS) ports. These payloads simply serve as an example and a new payload partition for an enhanced Master Information Block (MIB), denoted xMIB, is not precluded.

Second, a more complete set of system information, partitioned into System Information Blocks (SIBs), is conveyed using the PDSCH whereby the association with a PDCCH is by a SI-RNTI (System Information-Radio Network Temporary Identifier). More precisely, the UE monitors the common search space for PDCCHs whose Cyclic Redundancy Check (CRC) bits are scrambled with the SI-RNTI. In step 70, LTE payloads for the PDSCH, scheduled by the PDCCH, are shown. One or more System Information Blocks (xSIBs) provide an xPRACH configuration.

The Downlink Control Information (DCI) transmitted on the PDCCH schedules PDSCH transmissions on which the SIBs are conveyed. In LTE, for instance, the UE acquires SIB1 and SIB2 to transmit a PRACH as they contain, among others, the PRACH configuration, the Random Access Channel (RACH) configuration, as well as the downlink reference signal transmit power, which the UE uses for pathloss compensation when transmitting the PRACH sequence. Note that other payloads and other partitions of system information into SIBs are not precluded and are generically referred to as xSIB1 here.

The steps 50, 60, and 70, are transmitted by the eNB over the wireless media (air interface) using continuous and periodic signals/channels. After reception of the xPRACH configuration from the eNB in step 70, the UE has enough information to know which sequence to use in which time/frequency resources to trigger transmission of further System Information (SI) by the network.

In contrast to the steps 50, 60, and 70, the step 80 features uplink transmissions from the UE to the eNB, in some embodiments. In step 80, the UE employs a random access preamble signature to trigger the "on demand" SI acquisition, i.e., the transmission of additional system information beyond what has been received in steps 60,70. The xPRACH channel is used for many different things. Therefore, in some embodiments, after all necessary system information to transmit the xPRACH is acquired, the UE can modulate the xPRACH transmission with a dedicated sequence (or signature) to indicate that it is requesting transmission of additional SI from the eNB. This triggers the eNB to send the SI in the step 90 and may require a contention-based random access procedure in some embodiments.

Under LTE, the steps 80 and 90 are swapped. The eNB performs downlink transmissions as steps 50, 60, 70, and 90, continuously and periodically (although the periodicities of each step may not be identical). Following these steps, the UE would send the PRACH 80 to connect to the network, i.e., to request RRC connection setup. Here, by contrast, the UE sends the xPRACH (operation 80) to trigger "on demand" transmission of the step 90, namely, the transmission of additional system information from the network to the UE. Hence, continuous and periodic transmission of all SI as in LTE is not necessary resulting in the claimed energy savings end spectral efficiency improvements. More precisely, in some embodiments, the UE may transmit the xPRACH without intent to request RRC connection setup but rather to trigger transmission of additional SI. Thus, under the LOSIA method 100, the downlink transmission of step 90 is no longer continuous and periodic, but is instead performed "on demand". Subject to several different implementations of the random access preamble sequence (signature) of the UL step 80 further enhancements can be achieved as described below.

DETAILED DESCRIPTION

Embodiment 1

Returning to FIG. 1, in one embodiment of the LOSIA method 100, a single sequence for the random access preamble is reserved per cell or cell group either by specification or configuration. When the eNB receiver detects this dedicated sequence from any UE in its cell, the eNB subsequently transmits system information in the downlink. The UE, after transmission of the random access preamble sequence using the xPRACH channel to trigger the downlink transmission of system information, monitors for the eNB's SI transmission and, upon successful decoding, acquires the remaining system information.

Thus, in FIG. 2, step 70, the eNB indicates a dedicated sequence for SI acquisition in the xPRACH configuration. Any UE in that cell or cell group thus can transmit the sequence on the xPRACH channel, as indicated in step 80. SI transmission by the eNB triggered by a UE then follows in step 90.

Figure 3A:
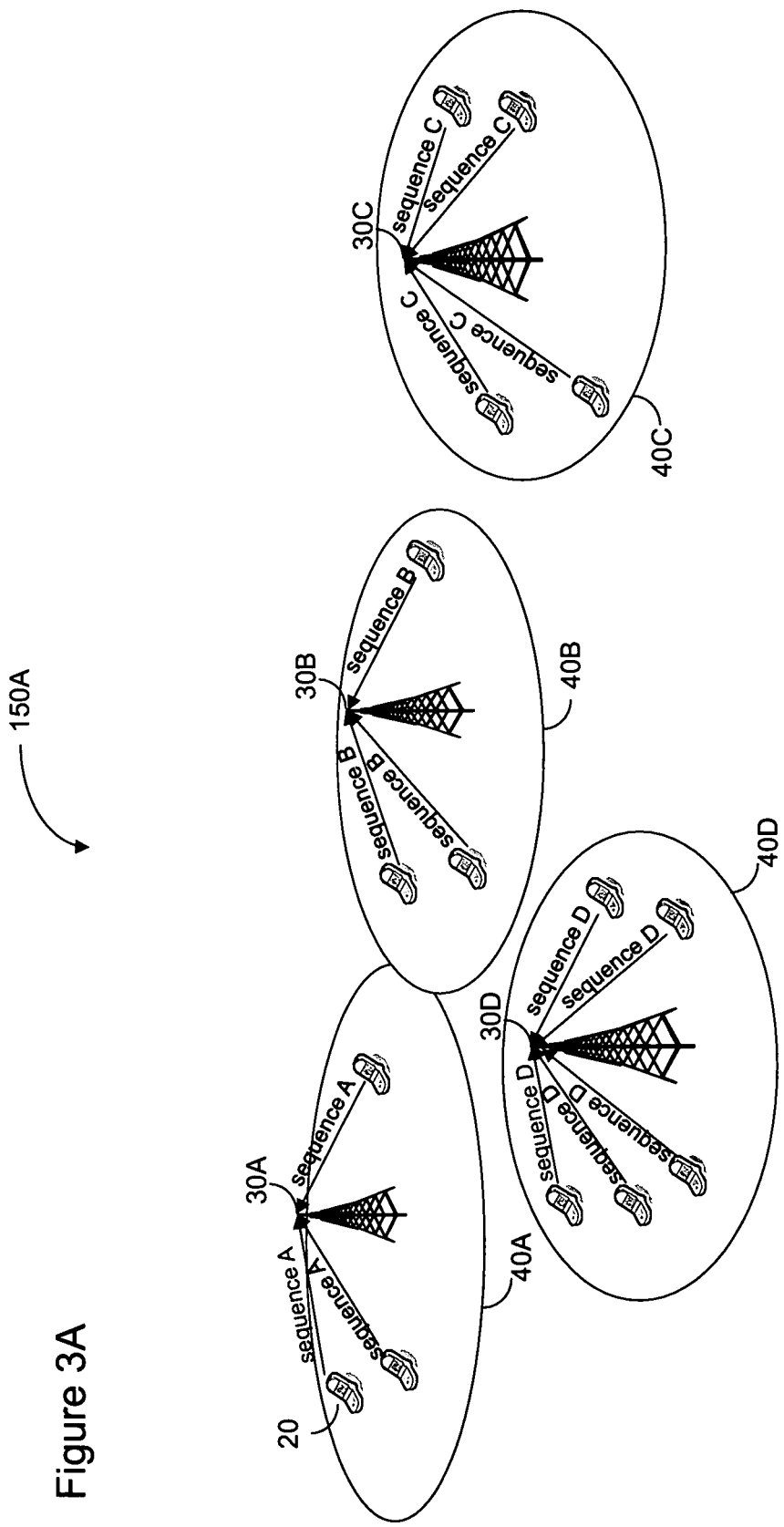
FIGS. 3A-3C illustrate a first embodiment of the LOSIA method of FIG. 1, according to some embodiments.
Figure 3B:
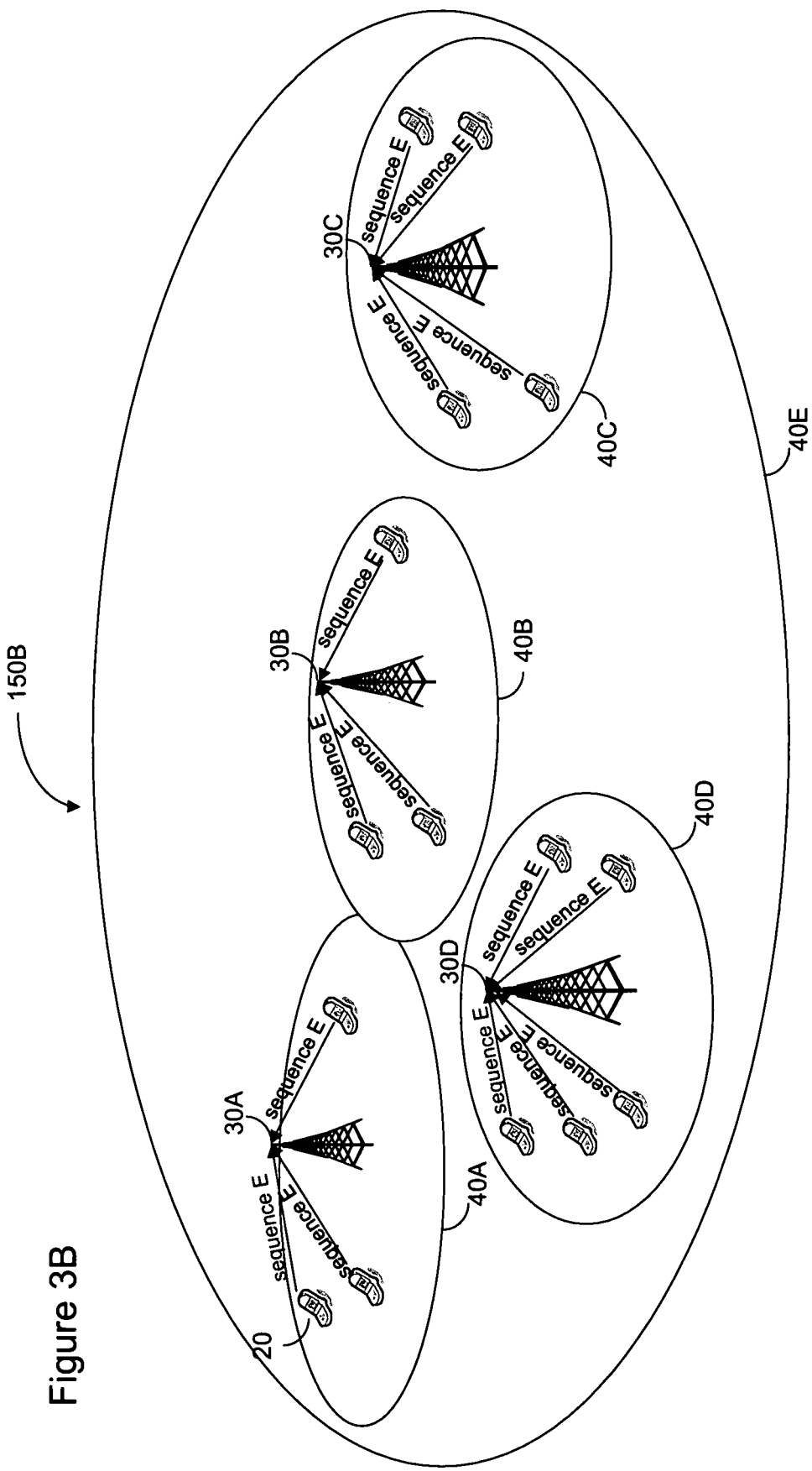

In some embodiments, the aforementioned transmission of system information by the eNB, which the UE has triggered by its xPRACH transmission, is cell-specific or cell group-specific. In the former, the payload is common for all UEs within a single cell; in the latter, the payload is common for all UEs within multiple cells. FIGS. 3A and 3B illustrate possible uplink transmissions and FIG. 3C shows the downlink transmission for this embodiment.

In FIG. 3A, a cellular neighborhood 150A consists of four cells 40A, 40B, 40C, and 40D (collectively, "cell(s) 40"), each of which is provided by a single respective eNB 30A, 30B, 30C, and 30D (collectively, "eNB(s) 30") as well as one or more UEs 20. (In the illustrations herein, a cell phone is depicted; however, the UE may consist of a cell phone, a smart phone, a personal digital assistant, a laptop computer, a notebook, a tablet, a pad, or any other technology operable in a cellular neighborhood.) The eNB 30A of cell 40A configures xPRACH sequence A for the purpose of triggering transmission of SI for cell 40A for any one or all of the UEs 20 in its cell; similarly, the eNB 30B of cell 40B configures xPRACH sequence B for the purpose of triggering transmission of SI for cell 40B, the eNB 30C of cell 40C configures xPRACH sequence C for the purpose of triggering transmission of SI for cell 40C, and the eNB 30D of cell 40D configures xPRACH sequence D for the purpose of triggering transmission of SI for cell 40D. Any one of the UEs 20 in a given cell may transmit the cell-specific sequence (that is, the random access preamble signature used for SI acquisition, as illustrated in step 80 of FIG. 2). Only one UE 20 in each cell 40 transmits the appropriate sequence, and the eNB 30 will subsequently transmit downlink SI information.

In FIG. 3B, the cellular neighborhood 150B is actually the same cellular neighborhood as in FIG. 3A, but this time cells 40A-40D with respective eNBs 30A-30D constitute a cell group 40E. In this circumstance, each eNB 30 in the cellular neighborhood configures the same xPRACH sequence, sequence E, for the purpose of triggering transmission of SI of a respective cell 40. (It does not matter which eNB in the cell group receives the sequence, as long as 1) one of the eNBs in the cell group transmits the SI information and 2) the requesting UE is able to receive the transmission.) The eNBs 30 of FIG. 3B are coordinated as a single cell group, thus enabling the same sequence to be used throughout the cell group. One UE 20 transmitting the sequence designated for the entire cell group 40E and one eNB from the cell group transmitting the SI information is sufficient.

Figure 3C:
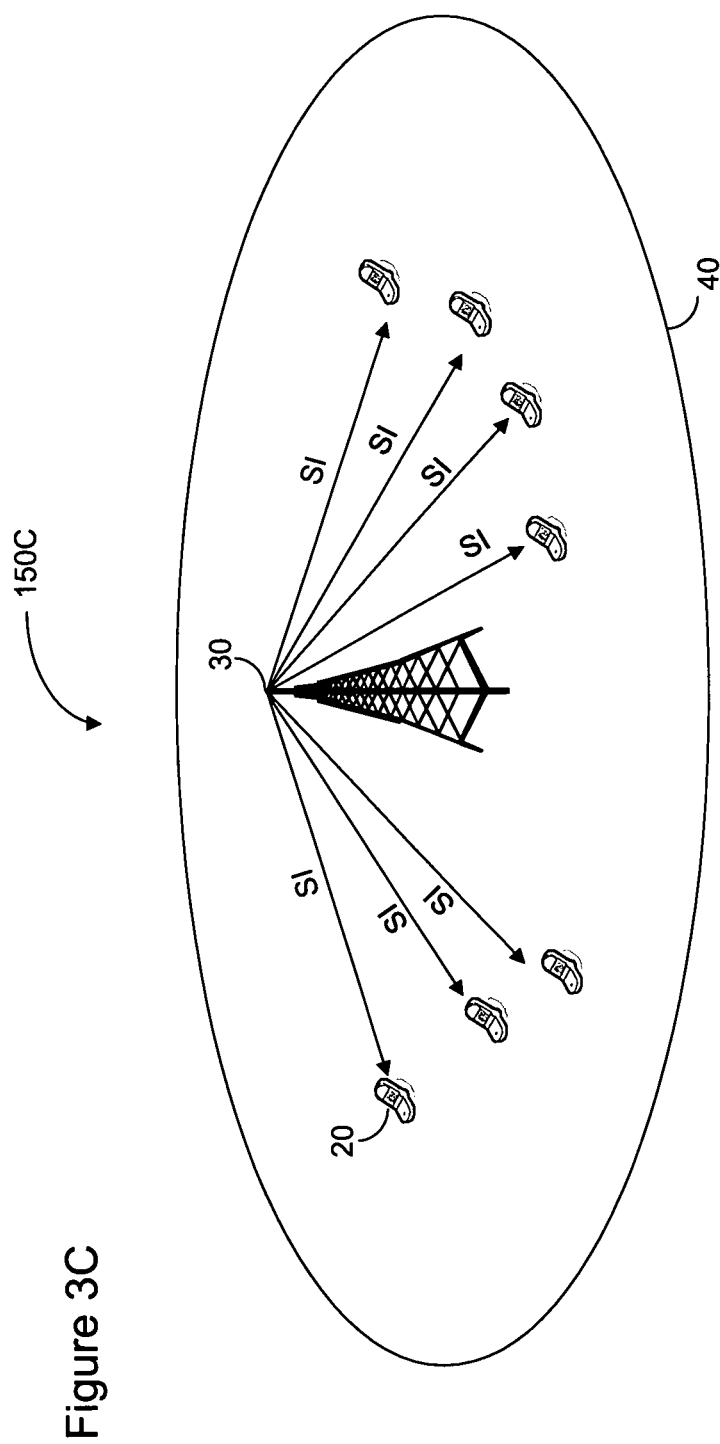

FIG. 3C shows that, whether coordinated by cell or cell group, the eNB 30 transmits the same system information to all UEs 20 within the cell 40.

Embodiment 2

Returning to FIG. 1, in one embodiment of the LOSIA method 100, the UE randomly selects a random access sequence from a set of predefined sequences known to both the UE and the eNB. When the eNB receiver detects this randomly selected sequence from any UE in its cell, the eNB subsequently transmits system information in the downlink, but this time, the information will be dedicated to the requesting UE, as described below. The set of known sequences to be selected by the UE can be dedicated for the LOSIA method 100, or, alternatively, can be the same set of sequences used for other random access procedures, such as those used to obtain uplink synchronization or to send a Scheduling Request (SR). Once the randomly selected sequence is transmitted, the UE monitors for the eNB's SI transmission to acquire the remaining system information.

Referring to FIG. 2, step 90, the SI information may be transmitted "UE-specifically" and this feature is utilized in the second embodiment. Such a feature may be desired in a cellular environment populated with UEs having different capabilities. For example, one UE may be an inexpensive phone with limited capabilities while another UE may be a feature rich smartphone. This embodiment enables the eNB to tailor the type of system information transmitted to each UE.

Figure 4A:
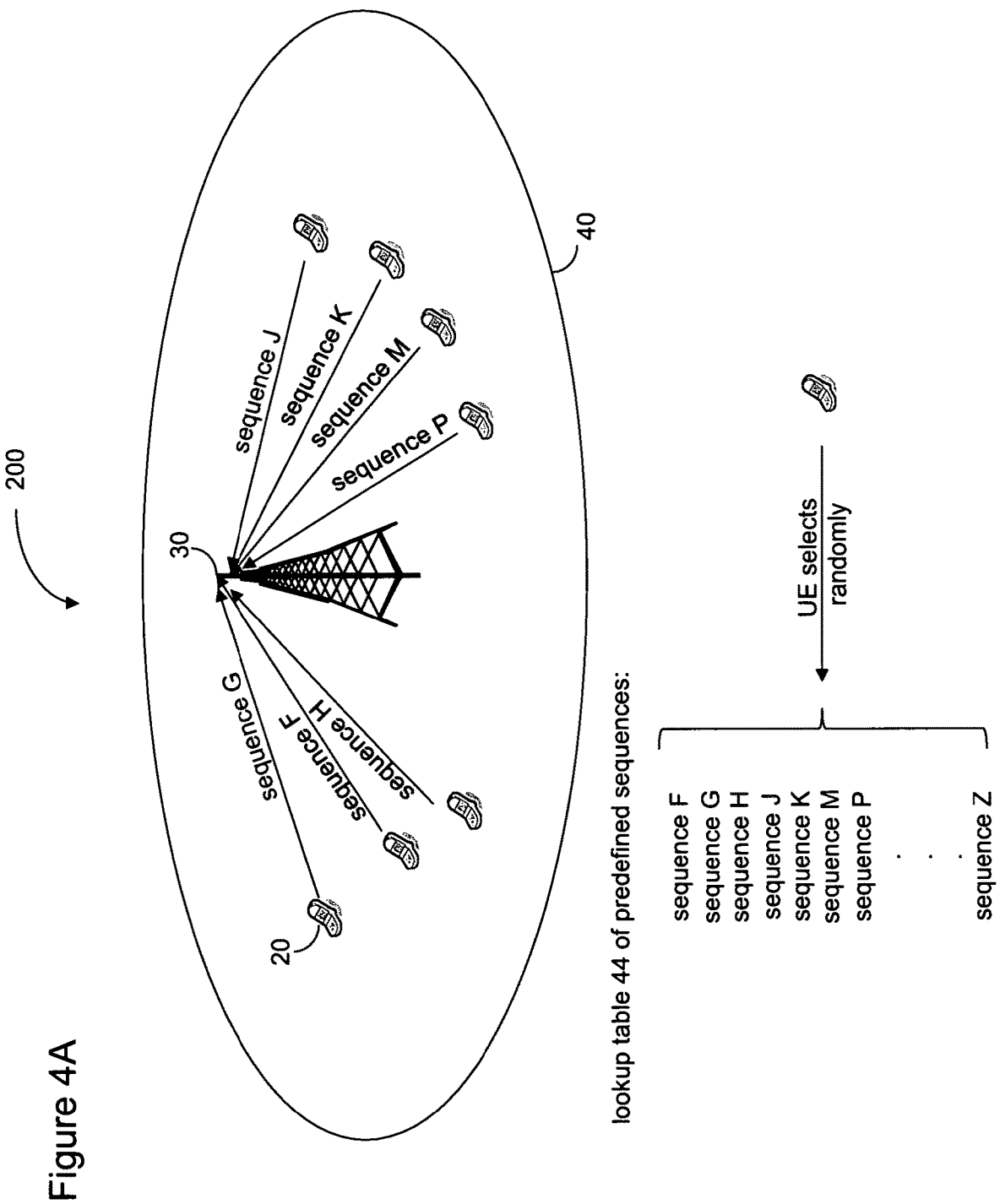
FIGS. 4A-4B are illustrations of a second embodiment of the LOSIA method of FIG. 1, according to some embodiments.
Figure 4B:
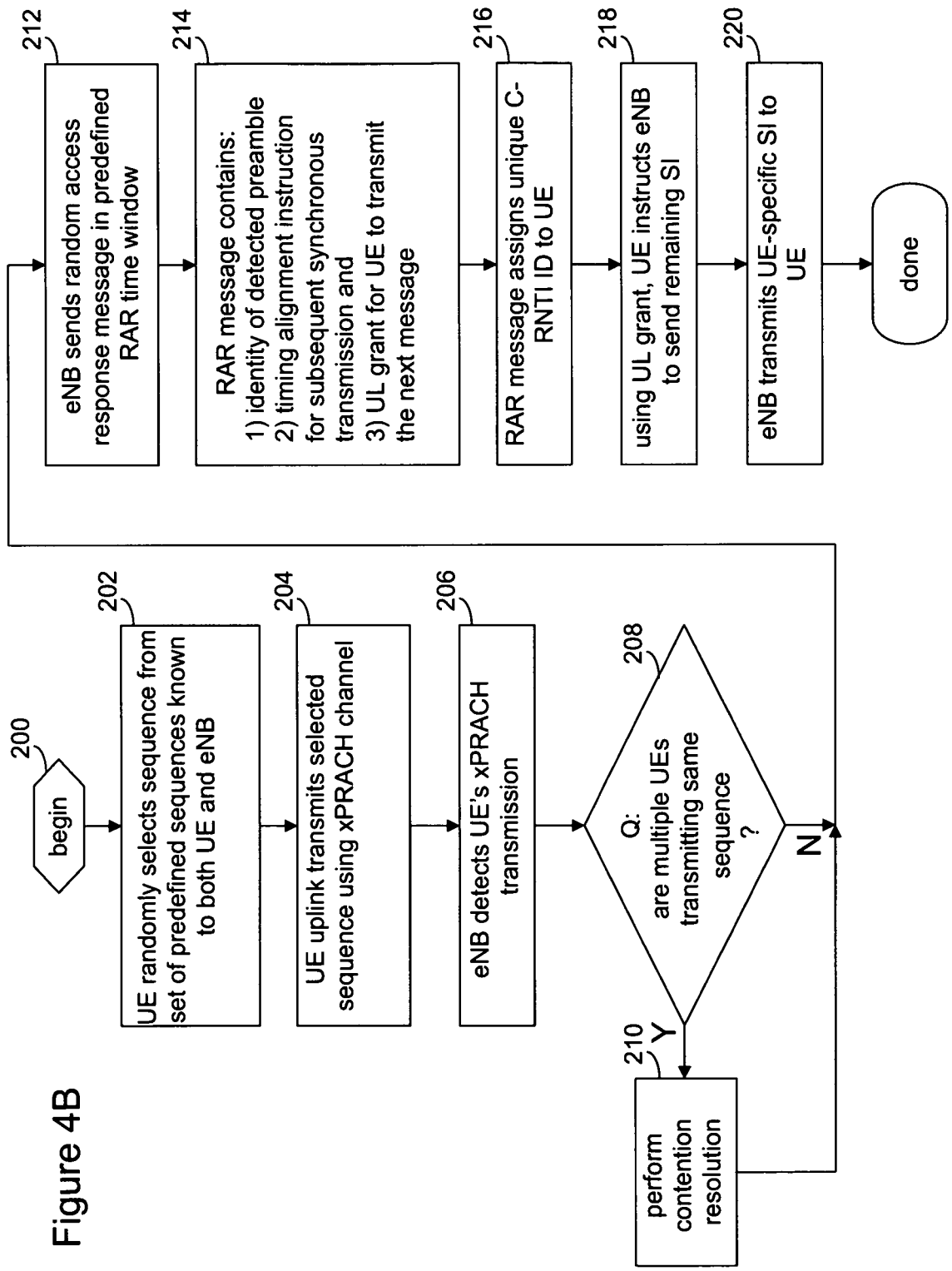

The second embodiment is illustrated in FIGS. 4A and 4B. In FIG. 4A, a cell 40 includes an eNB 30 and several UEs 20. Each UE randomly selects from a lookup table 44 of predefined sequences, denoted sequence F, G, Z, with the number of predefined sequences in the lookup table 44 being configurable or fixed. In FIG. 4A, each UE 20 randomly selects a different sequence to transmit via the xPRACH channel to the eNB 30. By receiving a unique randomly selected sequence from each UE 20, the eNB 30 is able to uniquely identify each UE.

FIG. 4B is a flow diagram including operations performed in the second embodiment. The UE 20 makes a random selection from the available predefined sequences known to both the UE and the eNB 30 (block 202), such as from the lookup table 44. The selected sequence is transmitted, as random access preamble signature (see FIG. 2, step 80) from the UE 20 to the eNB 30 using the xPRACH channel (block 204). The eNB 30 detects the transmitted sequence (block 206). If more than one UE 20 transmitted the same sequence (block 208), the eNB 30 will perform contention resolution before further transmissions take place (block 210). Since the UE has randomly chosen the initial sequence from a set of predefined sequences, if multiple UEs simultaneously choose the same sequence, before the eNB 30 can transmit the UE-specific SI, this intermediate contention resolution step resolves the conflict.

Upon successful detection of the UE's xPRACH transmission (and/or contention resolution), the eNB 30 sends a Random Access Response (RAR) in a predefined RAR time window, rather than the system information itself, to the UE 20 (block 212). The RAR message contains at least 1) the identity of the detected preamble, 2) a timing alignment instruction for subsequent synchronous uplink transmission, and 3) an UL grant for the UE to transmit the next message in the uplink (block 214). In addition, the RAR assigns a unique identifier to the UE 20, e.g., a Cell Radio Network Temporary Identifier (C-RNTI) (block 216). The C-RNTI, one dedicated to each UE 20 that has initiated communication with the eNB 30, replaces the randomly selected sequence as the identifier, e.g., it is a unique tag that remains associated with the UE as long as the UE is connected to the cellular network. Upon successful decoding of the RAR from the eNB 30, the UE 20 instructs the eNB to transmit the remaining system information, using the UL grant in the RAR (block 218). After successfully decoding the UE's instructions, the eNB 30 transmits UE-specific SI to the UE 20 (block 220).

Recall that the UE retrieves the SI from the xPDCCH and xPDSCH channels (step 90 of FIG. 2). In some embodiments, the UE 20 retrieves the UE-specific SI (step 220) by monitoring a common or UE-specific search space for the xPDCCH with the CRC scrambled by the C-RNTI. Since the UE is not assigned the unique identifier, C-RNTI, until after contention resolution, in some embodiments, a random access RNTI (RA-RNTI) is used to scramble the CRC of the xPDCCH scheduling the RAR (step 212).

Figure 5A:
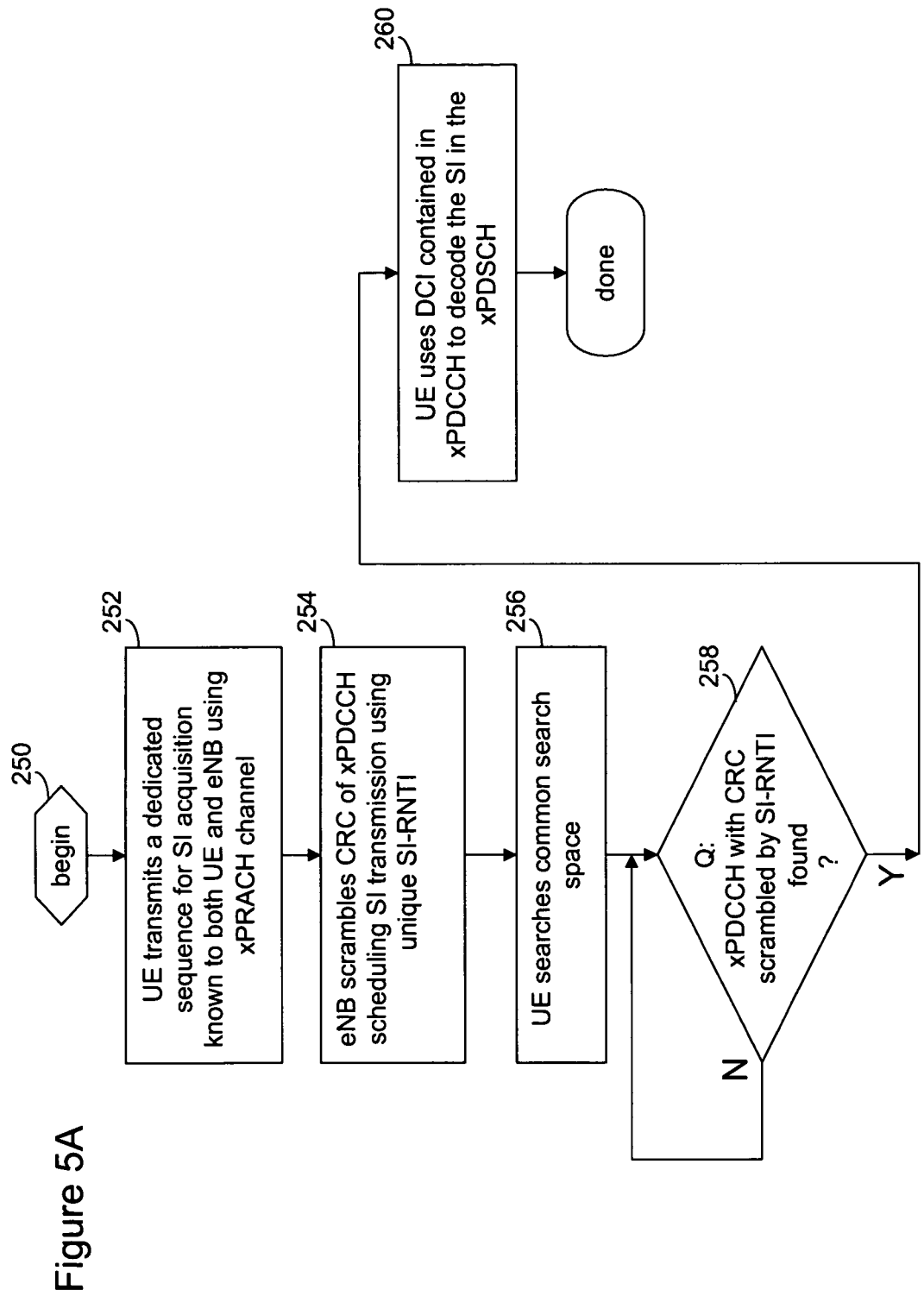
FIGS. 5A and 5B are illustrations of a third embodiment of the LOSIA method of FIG. 1, according to some embodiments.
Figure 5B:
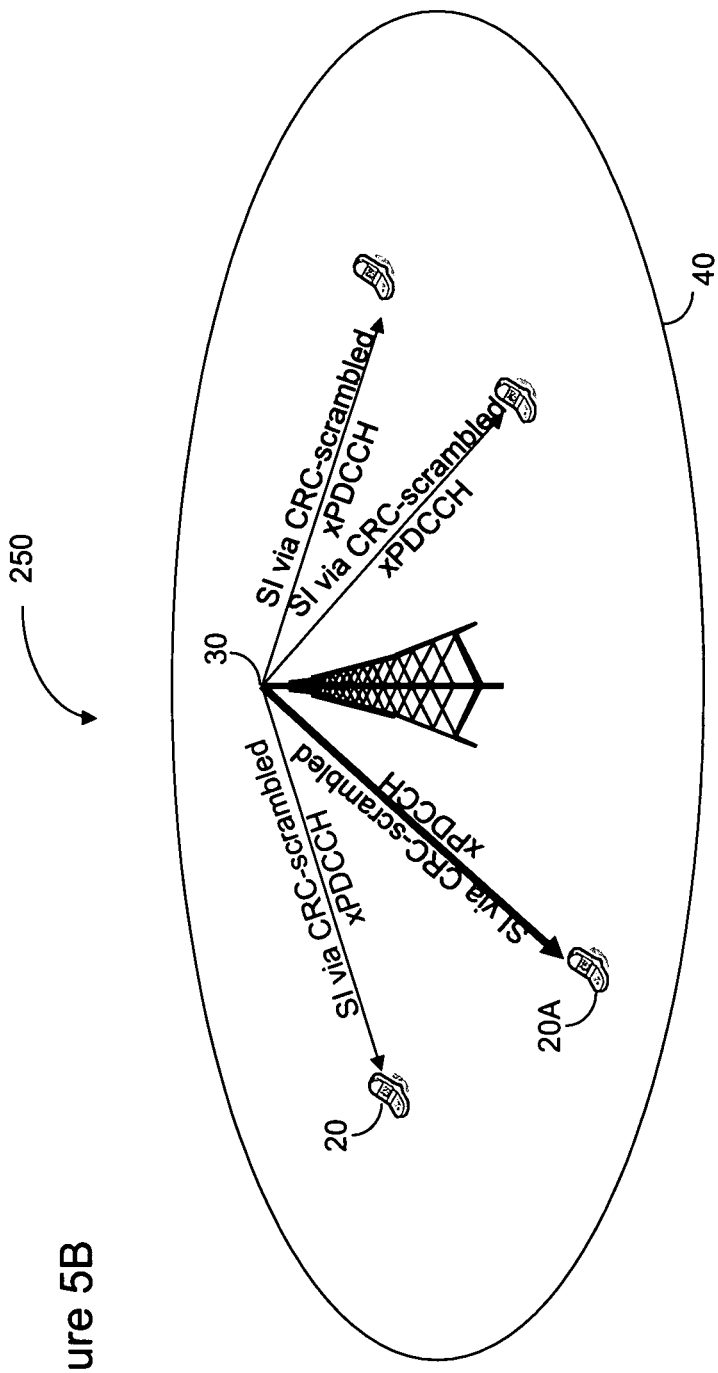

When the eNB receiver sends common system information triggered by an xPRACH with a dedicated sequence for SI acquisition as in the first embodiment, a unique identifier can be used to schedule the SI transmission in the downlink. Using LTE as an example, as illustrated in FIGS. 5A and 5B, the UE transmits the random access preamble sequence using the xPRACH channel (block 252). The eNB scrambles the CRC of the xPDCCH scheduling the SI transmission using a unique SI Radio Network Temporary Identifier (SI-RNTI) (block 254). After transmitting the xPRACH, the UE monitors the common search space (block 256) for an xPDCCH with CRC scrambled by the SI-RNTI (block 258). If one is detected, the UE then uses the Downlink Control Information (DCI) contained in this xPDCCH to decode the SI in the xPDSCH (block 260).

In FIG. 5B, the eNB 30 transmits the system information using the xPDCCH (as in step 90 of FIG. 2) and scrambles the CRC of the xPDCCH using SI-RNTI. UE 20A monitors the common and/or UE-specific search space for an xPDCCH that use the SI-RNTI to scramble the CRC. Thus, although the SI is broadcast to all UEs in the cell 40 (or cell group as the case may be), only the UE 20A receives the system information (successful receipt is indicated with thick arrow). This is an enhancement of embodiment 1 compared to existing methods, in which every UE that wants to receive SI can do so by monitoring for the SI-RNTI in predefined periodic time/frequency resources.

If, as in the case of the second embodiment, the SI transmission triggered by the xPRACH is UE-specific, the UE instead monitors the common or UE-specific search space for an xPDCCH with CRC scrambled by the C-RNTI. Since the UE is not assigned a unique identifier until after contention resolution, a random access RNTI (RA-RNTI) is used to scramble the CRC of the xPDCCH scheduling the RAR. This is an enhancement of embodiment 2 compared to existing methods, in which every UE that wants to receive SI can do so by monitoring for the SI-RNTI in predefined periodic time/frequency resources and where the SI is never UE specific (hence the common SI-RNTI identifier in methods of prior art).

Embodiment 3

Figure 6A:
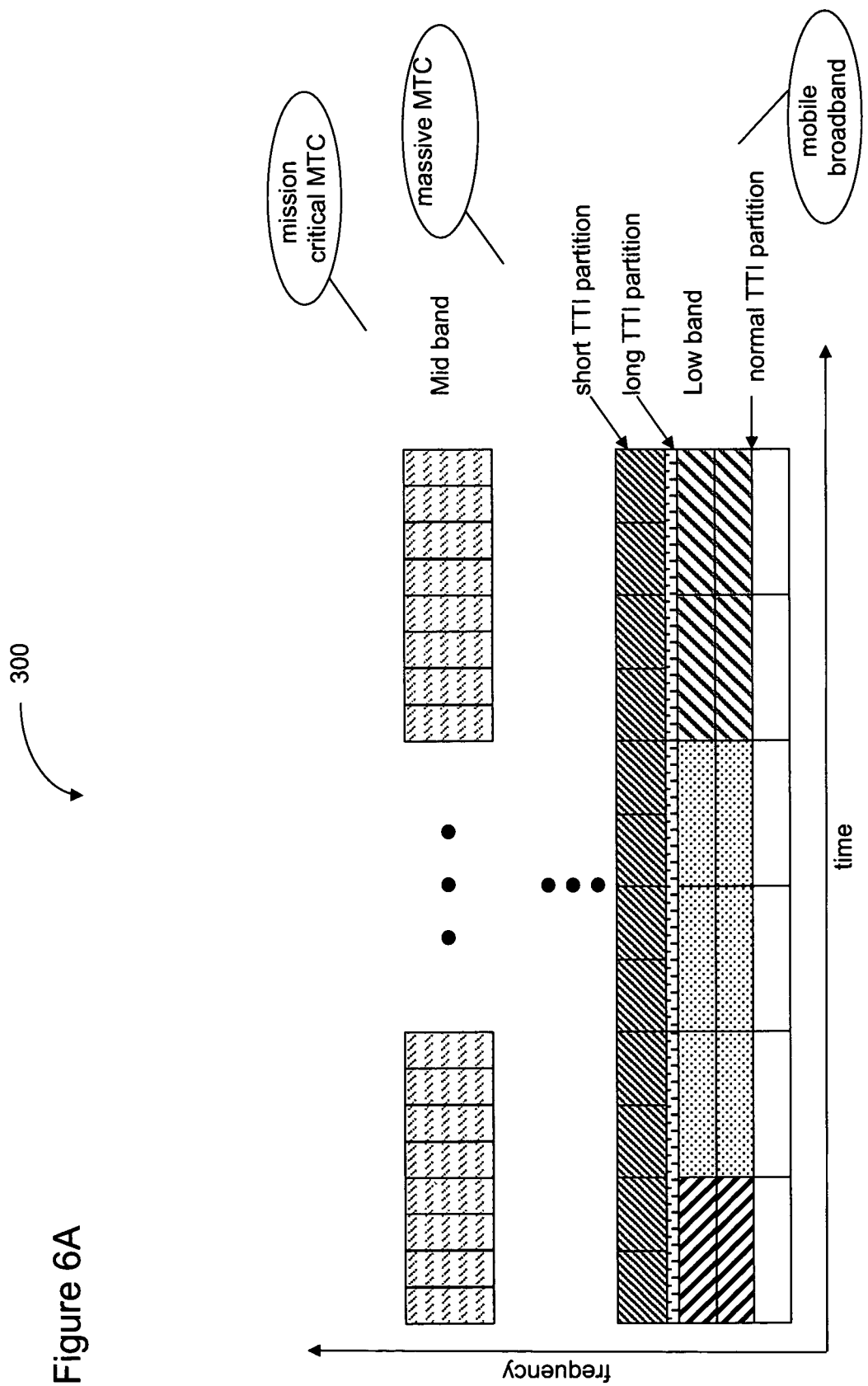

Returning to FIG. 1, in one embodiment of the LOSIA method 100, different sequences are dedicated to trigger different types of SI transmissions from the eNB, either by specification or by broadcasting such information in the xSIB1. FIGS. 6A and 6B illustrate this embodiment. FIG. 6A depicts an example of a flexible xRAT design with different partitions for different services and applications. Services may, for example, be divided into mission-critical MTC (Machine-Type Communications), massive MTC, and mobile broadband. Mission-critical MTC may include UEs in automobiles that communicate with one another, UEs that operate a power grid for a community, and so on, services in which very high reliability and low latency (delay) are desired. Massive MTC may include what is known in industry parlance as the Internet of Things (IoT), such as a home in which every appliance features a UE (e.g., the coffee maker, the toaster, the refrigerator). Because these are not critical services, they are characterized by "best effort" reliability and can successfully operate even with a large latency. Mobile broadband, which includes making and receiving voice calls, viewing and downloading video, and so on, is another service or application category.

For example, a short-TTI (Transmission Time Interval) partition may be reserved for mission critical MTC (Machine-Type Communications) services, a long-TTI partition for massive MTC services, and a normal TTI partition for mobile broadband services. Recall from FIG. 2 that the coarse time and frequency synchronization (step 50) and the bandwidth (step 60) are supplied by the eNB to any UE wanting to connect to the network. By partitioning the spectrum into different sections, and dedicating those sections to different UE service and application categories, each UE knows which section or partition of the time/frequency domain to access for receiving system information. The partitioning shown in FIG. 6A is just one example of how the time/frequency domain may be allocated and other UE service or application categories may be defined.

Either by specification or by broadcasting such information in the xSIB1, the different sequences dedicated to trigger SI transmissions from the eNB can be linked to these different partitions. Consequently, a UE can trigger SI acquisition (i.e., transmission of SI information by the eNB) for a given partition (in other words, service or application) by employing the associated sequence in its xPRACH transmission sent as a trigger. In this embodiment, the SI transmission by the eNB is not UE-specific but service-specific or RAT-specific.

FIG. 6B illustrates the operations of the LOSIA method 100, according to some embodiments. In one embodiment, the eNB provides the sequences for different services or applications in the xSIB message(s) (step 70 of FIG. 2) to each UE. In another embodiment, the sequences for different services or applications are predefined and thus known to each UE. Thus, the UE selects the appropriate sequence (block 302) for services and applications it provides and transmits the sequence using the xPRACH channel (block 304). The eNB detects the xPRACH transmission by the UE (block 306).

The eNB then determines which service category of UE sent the xPRACH transmission. If a mission-critical MTC UE sent the sequence (block 308), the appropriate mission-critical MTC system information is broadcast (block 310). If a massive MTC UE sent the sequence (block 312), massive MTC system information is broadcast by the eNB (block 314). If a mobile broadband UE sent the sequence, mobile broadband system information is broadcast (block 316). Because the mobile broadband UE may be feature rich with multiple services, its SI information is more extensive than for the massive MTC UE, which may only perform one or two operations (e.g., indicate that the toast is done if the UE is used in a toaster).

In another example, different sequences reserved to trigger SI transmissions from the eNB can be linked to different air interfaces. For instance, one xPRACH sequence can be linked to Device-to-Device (D2D) communications while another xPRACH sequence may be linked to relay communications.

Embodiment 4

Returning to FIG. 1, in one embodiment of the LOSIA method 100, dedicated xPRACH sequence(s) may be transmitted less frequently compared to xPRACH sequences for uplink synchronization. In particular, the xPRACH transmission instances used for SI transmission triggering can be predefined or configured by higher layers via MIB, SIBs, or dedicated RRC signaling.

In one example, xPRACH transmission instances used to trigger SI transmissions are defined as the uplink subframes satisfying the following equation:

$$(10 \times n_f + \lfloor n_s/2 \rfloor - N_{OFFSET,PRACH}) \bmod PRACH_{PERIODICITY} = 0 \quad (1)$$

where $n_f$ and $n_s$ are radio frame number and slot number, respectively; $N_{OFFSET,PRACH}$ is the xPRACH subframe offset and $PRACH_{PERIODICITY}$ is the xPRACH transmission periodicity.

In one example, $N_{OFFSET,PRACH}$ and $PRACH_{PERIODICITY}$ are defined by the parameter $I_{PRACH}$, which is given in Table 1. Note that other values of $I_{PRACH}$, $N_{OFFSET,PRACH}$, and $PRACH_{PERIODICITY}$ can be extended from the examples as shown in Table 1.

TABLE 1 xPRACH periodicity and subframe offset configuration

| xPRACH configuration index $I_{PRACH}$ | xPRACH periodicity $PRACH_{PERIODICITY}$ (ms) | xPRACH subframe offset $N_{OFFSET,PRACH}$ |
|---|---|---|
| 0-4 | 5 | $I_{PRACH}$ |
| 5-14 | 10 | $I_{PRACH}$-5 |
| 15-34 | 20 | $I_{PRACH}$-15 |
| 35-74 | 40 | $I_{PRACH}$-35 |
| 75-154 | 80 | $I_{PRACH}$-75 |

From Table 1, UEs assigned xPRACH configuration index $I_{PRACH}$ 0-4 will have a periodicity, $PRACH_{PERIODICITY}$ of 5 ms with a subframe offset $N_{OFFSET,PRACH}$ of $I_{PRACH}$ (0-4) while UEs assigned xPRACH configuration index $I_{PRACH}$ 5-14 will have a periodicity of 10 ms with a subframe offset $I_{PRACH}$-5 (0-9), and so on.

This embodiment enables the eNB to "listen" for xPRACH transmissions from a UE in a specific time and frequency resource, rather than having to monitor all the time. Using equation (1) and Table 1, each cell (eNB) may be assigned a different subframe for monitoring xPRACH transmissions.

Embodiment 5

Returning to FIG. 1, in one embodiment of the LOSIA method 100, dedicated time/frequency resources are reserved for xPRACH transmissions triggering SI acquisition. In one example, a dedicated frequency resource is allocated for xPRACH to trigger SI transmission. When UE transmits the xPRACH signal in this dedicated frequency resource, eNB will transmit the SI upon successful detection of the xPRACH signal.

In another example, a dedicated time resource is allocated for xPRACH to trigger SI transmission. For instance, xPRACH used to trigger SI transmission can be transmitted in subframe 0, 2, 4, 6, 8, within a single frame while xPRACH used for uplink synchronization can be transmitted in subframe 1, 3, 5, 7, 9 within a single frame.

In another example, a combination of time-division multiplexing (TDM) (by allocating different time resources), frequency-division multiplexing (FDM) (by allocating different frequency resources), and/or code-division multiplexing (CDM) (by allocating different xPRACH sequences) can be used to differentiate the xPRACH transmission for uplink synchronization and that for triggering SI transmission.

Recall that, in addition to obtaining system information, the xPRACH channel is also used by the UE for uplink synchronization, to make a scheduling request, to make an RRC connection setup request, and to perform other tasks. Where the UE sends the xPRACH to trigger common or service/RAT-specific SI acquisition (that is, not UE-specific SI acquisition), the communication for SI acquisition is broadcast or multicast in nature. (For the case where the eNB assigns a C-RNTI to the UE (e.g., embodiment 2), the SI acquisition procedure is unicast in nature.) In other words, the eNB may not estimate the timing advance from the xPRACH transmission and may not respond to the xPRACH with a timing advance assignment or uplink grant. This significantly decreases eNB receiver and scheduler complexity, as the eNB merely detects the sequence transmitted on the xPRACH that triggers the SI transmission.

For the case where multiple UEs transmit identical sequences in the same time-frequency resource, e.g., because there is a single dedicated sequence (cf., embodiment 1) or because the UEs request SI for the same service/RAT (cf., embodiment 3), the detection performance at the eNB is improved due to macro diversity. An example of macro diversity is when the transmission from one UE is blocked (such as by a building) but the eNB nevertheless receives the transmission from another UE, resulting in transmission of triggered SI.

Further, where the eNB is receiving transmissions of a single sequence from multiple UEs, such as with embodiment 1, FIG. 3B, another efficiency gain is obtained from multiple UEs forming a single-frequency network (SFN) transmitting identical PRACH sequences from dispersed locations, resulting in SFN gain. In some embodiments, the LOSIA method 100 employs both macro diversity and SFN to improve detection performance.

Similarly, since the UE does not send the xPRACH to connect to a cell—but rather to obtain SI—multiple eNBs can detect the xPRACH transmission and can jointly transmit the SI in an SFN fashion, assuming the backhaul and coordination capabilities of the network controlling these eNBs allow for such processing.

Recall from the first embodiment (FIGS. 3A and 3B) that multiple UEs may transmit the same sequence to each cell or cell group. The cell group may be made up of a single macro eNB and several small cell eNBs, with the smaller cells helping to improve coverage or boost capacity. From the perspective of the UE, multiple eNBs may look like a single cell. In yet another example, the network could dynamically decide which eNB of the plurality of eNBs receiving the xPRACH can transmit the SI. This gives rise to a "cell-less" RRC_IDLE state since the UE is not camping on a given cell of a given eNB. As one example, the LOSIA method 100 may define the eNB that receives the xPRACH with the strongest received power as the one to transmit the SI.

Figure 7:
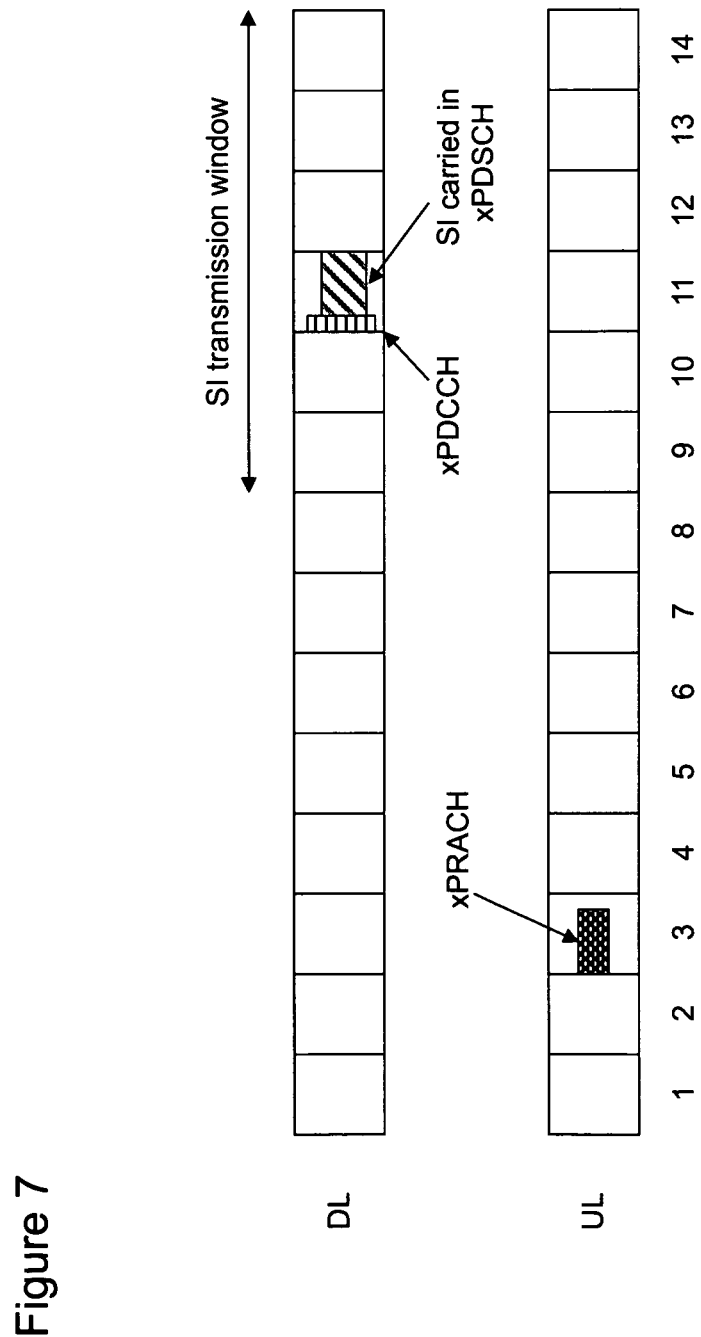
FIG. 7 is an example system information transmission window used in the sixth embodiment of the LOSIA method of FIG. 1, according to some embodiments.

Note that after the xPRACH is transmitted, the UE expects to receive the SI within a defined time window. The position of this SI transmission window can be predefined or configured by higher layers via MIB, SIB1/2, or dedicated RRC signaling. FIG. 7 illustrates the SI transmission window in response to the xPRACH transmission by the UE, according to some embodiments. In one example, similar to the random access response (RAR) window defined in LTE, the UE can start to monitor for SI transmission three subframes after the xPRACH transmission. In FIG. 7, the xPRACH uplink transmission takes place in the third subframe while the eNB sends the xPDCCH and xPDSCH channels in the eleventh subframe. Thus, there is a delay (window size) of eight subframes between request and receipt. In some embodiments, the window size is configured in an SI-ResponseWindowSize information element (IE), where a range of 0-10 subframes is indicated.

As mentioned above, independent xPRACH sequences may be used to trigger the SI transmission for different applications, partitions, or services. To further differentiate the SI transmission for these applications, partitions, or services, different Radio Network Temporary Identifiers (RNTI) may be considered. For instance, an SI-D2D-RNTI and SI-MTC-RNTI may be defined for SI transmission of the D2D and MTC applications, respectively. In this case, UEs with D2D capability would decode xPDCCHs with CRC scrambled by SI-D2D-RNTI and the corresponding xPDSCH for D2D SI transmission, whereby the scrambling initialization of xPDSCH is by the SI-D2D-RNTI.

As part of its Radio Resource Management (RRM) procedures, the UE continuously and periodically performs RRM measurements. If the RRM procedures indicate that the UE is moving out of the coverage of one cell/transmission point and into the coverage of another (e.g., the relative strength of the Reference Signal Received Power (RSRP) changes in favor of a different cell/transmission point), the UE performs the steps outlined in FIG. 2 to obtain the xPRACH configuration of the new, stronger cell and subsequently obtains the SI for the new cell.

Further Variations Depending on the System Load

Embodiment 6

Returning to FIG. 1, in one embodiment of the LOSIA method 100, the system information acquisition scheme operates in one of two modes to account for differences in network/traffic load. A flag updated by the eNB and available to all UEs, is used to discern between the two operating modes.

In conventional LTE/LTE-A wireless communication systems, the system information is periodically broadcasted at all times. This is very efficient when the load in the network is high, as UEs in RRC-IDLE mode can autonomously receive SI without network intervention. Only when moving from one tracking area to another does the UE send a PRACH to inform the network of its new tracking area. However, at times of low load and especially low mobility, the periodic and continuous transmission of SI is inefficient.

For example, during nighttime hours, UEs may not move between cells and may not have data to transmit or receive. UEs simply acquire SI with very long periodicity according to a defined timer, e.g., every three hours. The continuous and periodic transmission of SI every tens or hundreds of milliseconds by the eNB thus leads to enormous energy consumption at the eNB transmitter, during which no (or few) UEs are receiving the transmissions. The LOSIA method 100 thus enables the network to configure the eNBs to transmit SI differently, depending on the system load.

Figure 8:
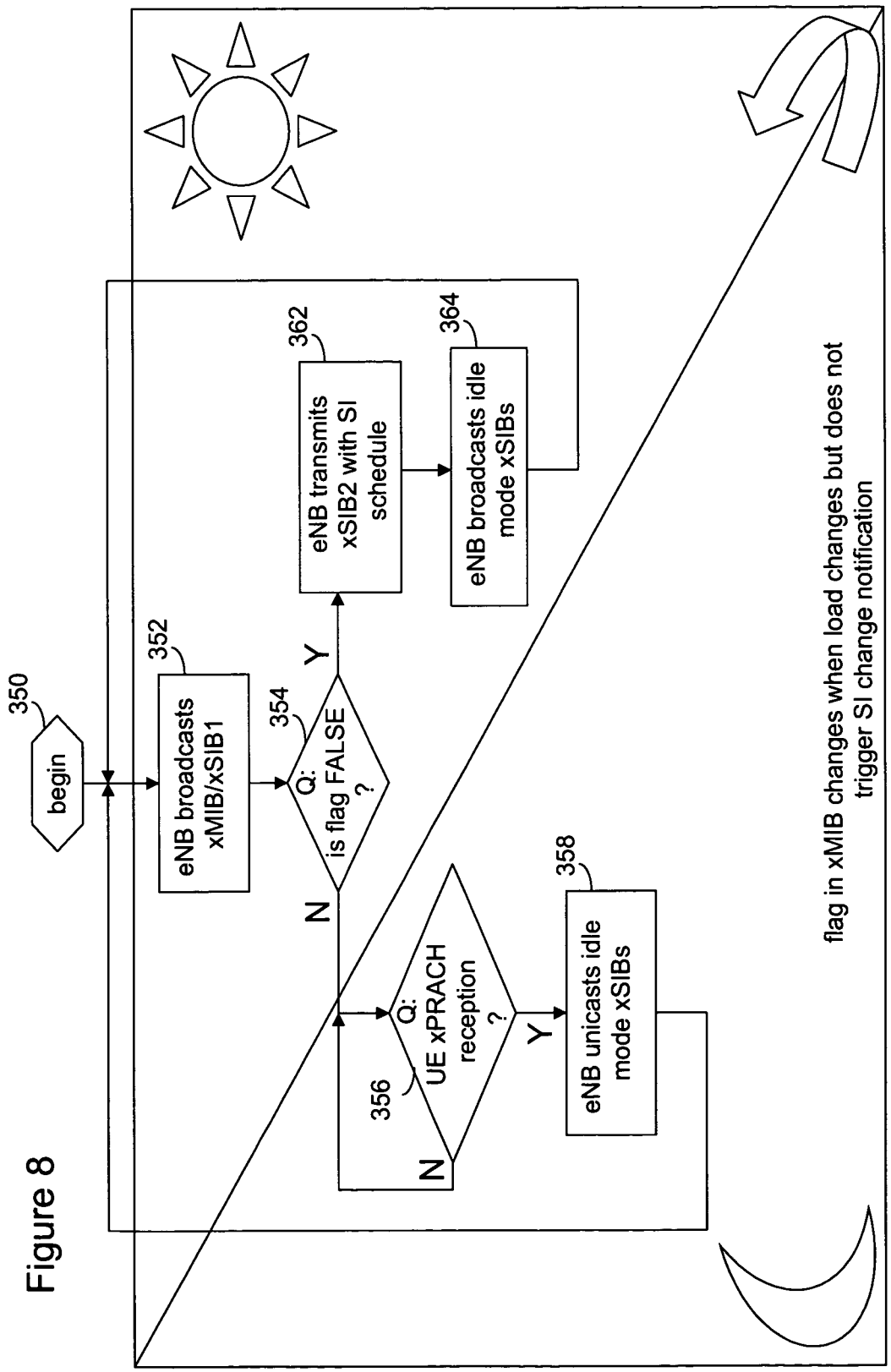
FIG. 8 is an example of load-dependent transmission used by the seventh embodiment of the LOSIA method of FIG. 1, according to some embodiments.

In some embodiments, the LOSIA method 100 addresses the energy consumption issue as illustrated in the flow diagram 350 of FIG. 8. The illustration is split into two parts, with a crescent moon shape indicating typical nighttime, namely, low network/traffic load behavior (fewer UE connections to the network) and a sun shape indicating typical daytime behavior, namely, medium to high network/traffic load (more UE connections to the network). Thus, in embodiment 6, the LOSIA method 100 envisions two modes of behavior, e.g., daytime (high load) mode and nighttime (low load) mode. The operations associated with the nighttime mode may nevertheless occur during the day and the operations associated with the daytime mode may occur during the night.

The flow diagram 350 begins with the eNB broadcasting the xMIB/xSIB1 transmissions that enable the UE to access the network, as illustrated in steps 50, 60, and 70 of FIG. 2 (block 352). A flag is consulted to determine whether the eNB is to operate in daytime mode or nighttime mode (block 354). In some embodiments, the eNB broadcasts the flag (e.g., in the xMIB or the xSIB1) to indicate the current mode of SI transmission.

During times of high load, the flag is set to FALSE (block 354) and legacy LTE procedures apply, that is, all xSIBs are periodically and continuously transmitted, and UEs can autonomously receive xSIB2 (block 362) and/or RRC_IDLE mode SI (block 364). When the load in the cell decreases and the continuous and periodic transmission of all SI becomes inefficient, the network sets the broadcasted flag to TRUE (block 354).

During times of low load, the flag is set to TRUE (block 354) and procedures apply according to the embodiments herein, that is, xSIBs are transmitted (block 358) based on a trigger from a UE (block 356).

In some embodiments, the change in the flag value may not trigger all UEs to reacquire all SI. Instead, those UEs obtaining new access to the network or those updating their SI may simply check the xMIB/xSIB1 for the value of the flag. In addition, in some embodiments, when changing the flag broadcasted in the xMIB/xSIB1, the eNB does not immediately cease transmission of all SI, but allows for some grace period where UEs currently decoding the SI have enough time to finish final SI acquisition. Similarly, when switching from low to high load and changing the broadcasted flag accordingly, the network can either continue transmission of the triggered SI for a certain grace period as described above, or, alternatively, the network can let the triggered SI transmission occur at the same time/frequency resources as the periodic continuous ones, such that the change is transparent to the UE. The grace period addresses the fact that the eNB does not receive feedback from the UE once the UE has completed SI acquisition.

A similar problem occurs when the SI is not transmitted continuously and periodically. Using LTE as an example, for the case where SI is transmitted continuously and periodically (daytime mode), the UE can employ incremental redundancy (IR) to combine several SI transmissions within the same SI window and can repeatedly try to decode SI until successful decoding because the SI is transmitted periodically. In some embodiments, the LOSIA method 100 employs a timer that is activated at the UE upon transmission of the xPRACH triggering SI acquisition and at the eNB upon successful reception of the aforementioned xPRACH. Note that the aforementioned timer may be different for the eNB and the UE. Until this timer expires, the eNB sends copies of the same SI messages in order to allow the aforementioned procedures using IR at the UE.

For example, the first triggered xSIB could contain a schedule to instruct the UE how to combine SI transmissions for IR, e.g., the concept of SI windows could be applied in a manner similar to that of the LTE specification. After expiration of the timer at the eNB, the eNB stops transmitting SI if the network is in the nighttime mode and no other xPRACH triggering SI transmission has been received. If the timer expires and the UE has not yet successfully decoded the SI, the UE repeats the procedure by sending another xPRACH to trigger another burst of SI transmissions from the eNB.

For the case where the eNB transitions from the low load to the high load mode, if the UE has not successfully decoded the SI, the UE can transmit another xPRACH. This results in unnecessary xPRACH transmissions by the UE since SI information meanwhile has become continuous and periodic from the eNB. Alternatively, the UE can check the flag in the xMIB/xSIB1 before sending another xPRACH to trigger SI acquisition.

For the case where the eNB transitions from the high load to the low load mode, if the UE fails to acquire all SI successfully, the UE can either first check the xMIB/xSIB1 for the flag before resuming SI acquisition (in case the eNB has ceased periodic and continuous transmission of SI). Alternatively, the UE can simply assume that the eNB is still in the high load case and it is left to UE implementation when the UE checks for the flag to trigger SI transmission via an xPRACH, in case the mode has switched from high load to low load during the SI acquisition procedure at the UE.

Embodiment 7

Returning to FIG. 1, in one embodiment of the LOSIA method 100, to improve robustness and latency of the SI acquisition, all SI for RRC connection setup are continuously and periodically transmitted whereas any of the aforementioned examples and embodiments only apply to the SI required for RRC_IDLE mode.

The UEs essentially operate in one of three modes. They are either off, in which case the network has no access to the UE, they are actively being used (connected mode), or they are connected to the network but not in use (idle mode). When in idle mode, the network nevertheless may be able to access the UE, such as when the UE receives a voice call, a text message, and so on.

Since some of the SI, namely, the SI for RRC connection setup, is transmitted continuously and periodically, no energy savings are available. At the same time, the majority of SI, which applies to RRC_IDLE mode only, is transmitted on demand, in some embodiments. Since the RRC_IDLE mode generally is more tolerant to delay, the majority of energy savings can be retained without sacrificing robustness or latency for delay-sensitive RRC connection setup procedures.

Further Variations Depending on Factors Other than System Load

Embodiment 8

Returning to FIG. 1, in one embodiment of the LOSIA method 100, the aforementioned flag broadcasted as part of the xMIB/xSIB1 (FIG. 8) is not set depending on the load but depending on other considerations.

For example, in millimeter-wave deployments, the communication link between the eNB and the UE might suffer from severe pathloss. This pathloss is generally overcome by employing analog (or RF or passband) beamforming at both the transmitter (Tx) and/or receiver (Rx) such that the equivalent channel, incorporating both the physical propagation channel as well as the Tx and Rx RF beamforming, has acceptable coupling losses between the transmitter and receiver. However, such analog beamforming is generally UE-specific and requires extensive training. It may thus be beneficial to limit the amount of cell-specific transmissions (which are potentially omni-directional) and to transmit as much information as possible via dedicated unicast channels, which can benefit from the aforementioned analog beamforming.

Figure 9:
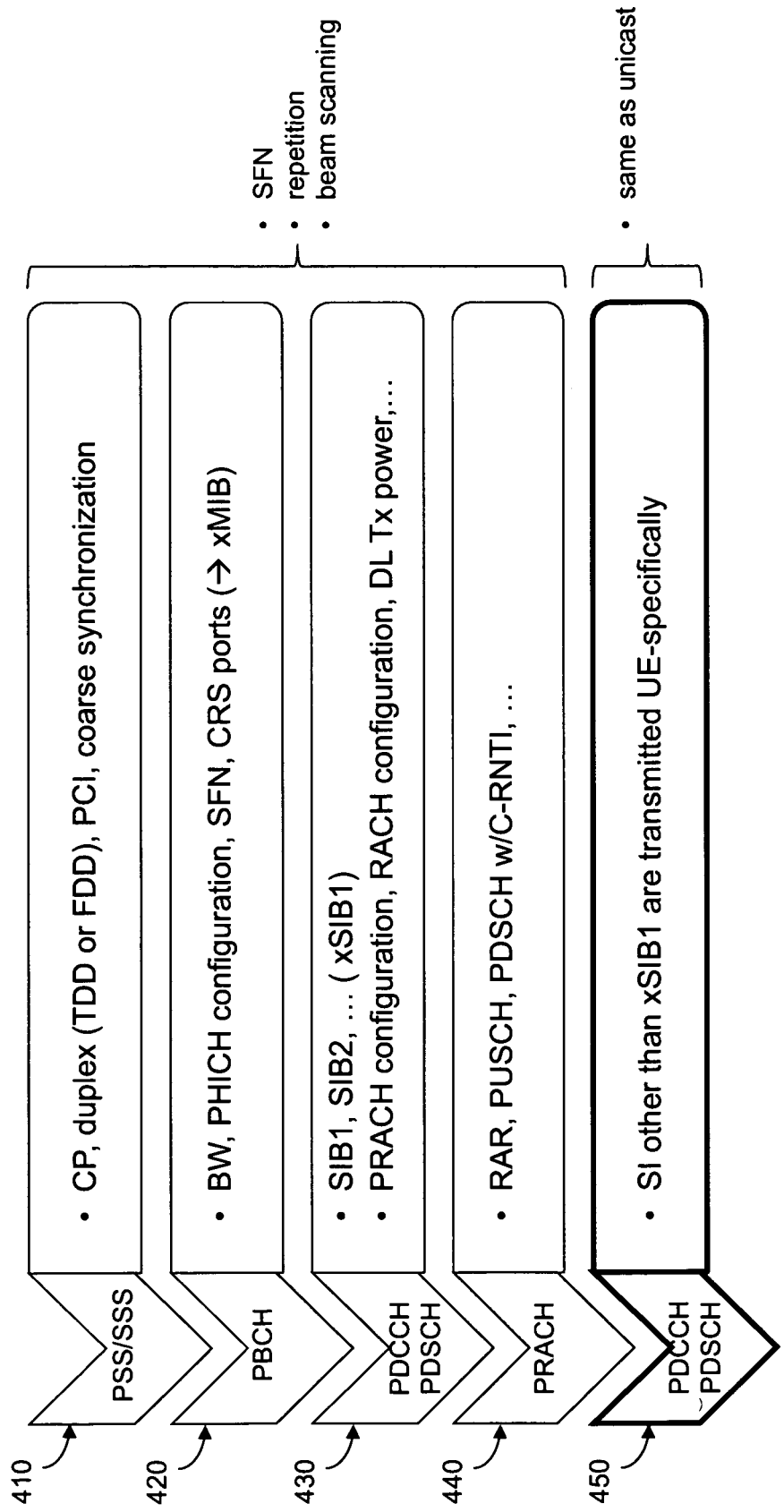
FIG. 9 is an example of a millimeter wave communication system employed by the ninth embodiment of the LOSIA method of FIG. 1, according to some embodiments.

FIG. 9 shows one such example of a millimeter-wave communications system. Using LTE as an example, PSS, SSS, PBCH, as well as PDCCH and PDSCH associated with xSIB1 (steps 410, 420, and 430) are sent by the eNB in a broadcast fashion. In order to overcome the severe path loss, SFN, time domain repetition, or beam scanning techniques can be employed. This, however, results in a decrease of the spectral efficiency, since resources are being used repeatedly in frequency, time, and space, respectively. After the xPRACH is decoded successfully by the millimeter-wave receiver of the eNB (step 440), the eNB millimeter-wave transmitter can send the remaining SI using optimal (UE specific) analog beamformers, resulting in an increase of spectral efficiency.

Operating Environment

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
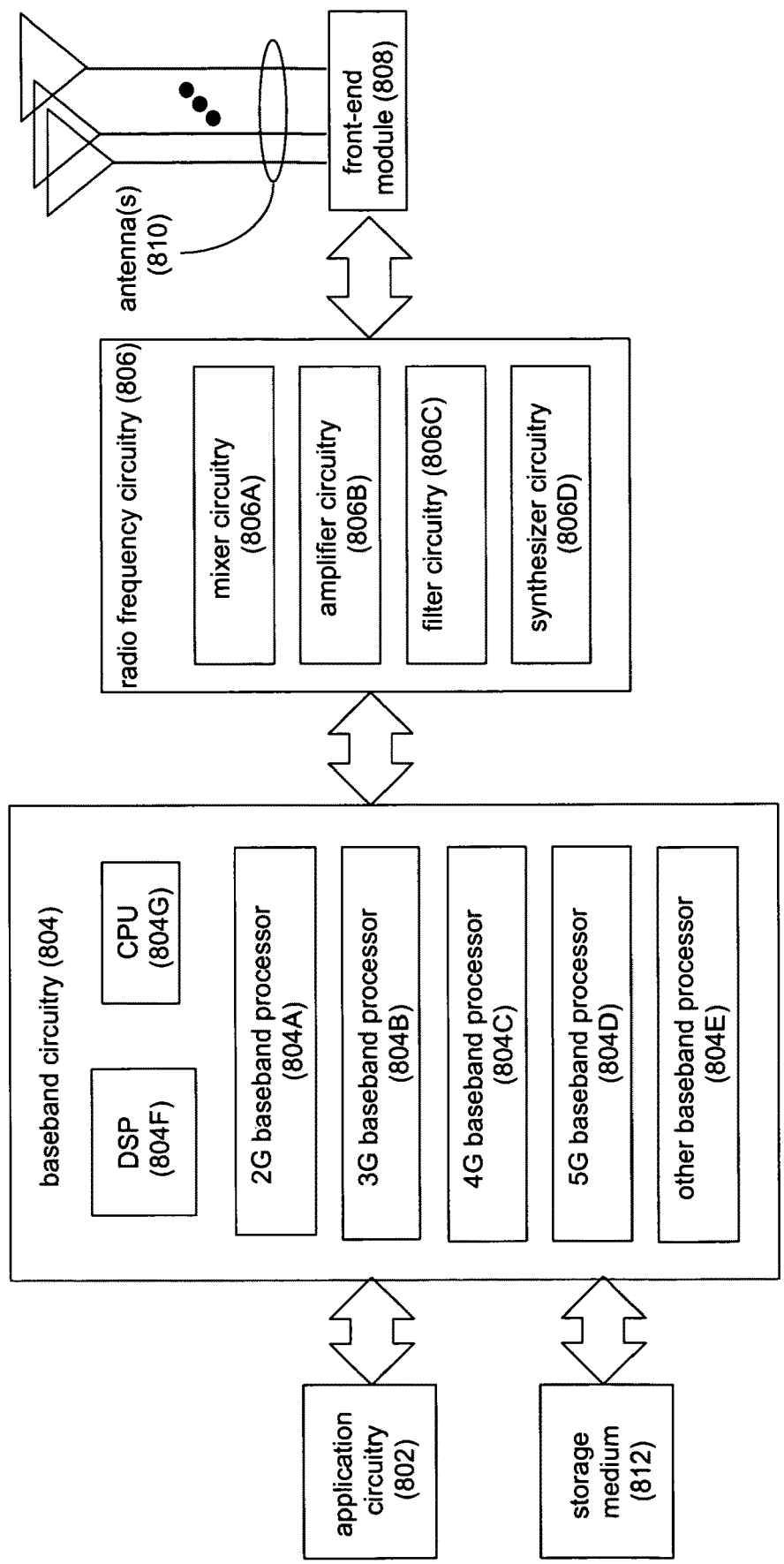
FIG. 10 is a simplified block diagram of a UE capable of implementing the LOSIA method of FIG. 1, according to some embodiments.

Embodiments described herein may be implemented into a system using any suitably configured hardware and/or software. FIG. 10 illustrates, for one embodiment, example components of a User Equipment (UE) device 800. In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 812 or other type of memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804A, third generation (3G) baseband processor 804B, fourth generation (4G) baseband processor 804C, a fifth generation (5G) baseband processor 804D, and/or other baseband processor(s) 804E for other existing generations, generations in development, or to be developed in the future (e.g., sixth generation (6G), etc.). The baseband circuitry 804 (e.g., one or more of baseband processors 804A-E) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, physical (PHY), media access control (MAC), radio link control (RLC), packet data convergence protocol (PDCP), and/or radio resource control (RRC) elements. A central processing unit (CPU) 804G of the baseband circuitry 804 may be configured to run elements of the protocol stack for signaling of the PHY, MAC, RLC, PDCP, and/or RRC layers. In some embodiments, the baseband circuitry may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an EUTRAN and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B and filter circuitry 806C. The transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by filter circuitry 806C. The filter circuitry 806C may include a low-pass filter (LPF), although the scope of the embodiments is not limited in this respect.

In some embodiments, the mixer circuitry 806A of the receive signal path and the mixer circuitry 806A of the transmit signal path may include two or more mixers and may be arranged for quadrature downconversion and/or upconversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry may be arranged for direct downconversion and/or direct upconversion, respectively. In some embodiments, the mixer circuitry 806A of the receive signal path and the mixer circuitry of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-N synthesizer or a fractional N/N+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806D of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 806D may be configured to generate a carrier frequency as the output frequency, while in other embodiments, the output frequency may be a multiple of the carrier frequency (e.g., twice the carrier frequency, four times the carrier frequency), and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the UE device 800 may include additional elements such as, for example, memory/storage, display, camera, sensor, and/or input/output (I/O) interface.

In summary, the LOSIA method 100 may be implemented by a user equipment (UE) in a first example occupying a Radio Access Network (RAN), the UE to initiate a cell search of the RAN to decode a limited set of system information (SI), transmit a preamble/sequence to a RAN base station transceiver, wherein the preamble/sequence indicates a request for additional SI, and monitor for transmission of the additional SI in the RAN.

Further to the first example or any other example discussed herein, in a second example, the UE may further decode the additional SI, wherein the UE is thereafter able to communicate with the RAN base station.

Further to the second example or any other example discussed herein, in a third example, the additional SI is common to all UEs operating in the RAN.

Further to the second example or any other example discussed herein, in a fourth example, the additional SI is specific to the UE relative to other UEs operating in the RAN.

Further to the first, second, third, or fourth examples or any other example discussed herein, in a fifth example, the UE further transmits the preamble/sequence by randomly selecting the preamble/sequence from a set of predefined preamble/sequences.

Further to the fifth example or any other example discussed herein, in a sixth example, the preamble/sequence transmissions trigger additional SI associated with an identifier.

Further to the sixth example or any other example discussed herein, in a seventh example the identifier is selected from a group consisting of a common radio network temporary identifier (RNTI), a UE-specific RNTI, a UE-specific RNTI that has changed following contention resolution, an RNTI specific to a service/application, or an RNTI specific to a radio access technology (RAT).

Further to the first, second, first, fourth, or fifth examples or any other example discussed herein, in an eighth example, the preamble/sequence indicates a request to send the additional system information for a predetermined service or application.

Further to the eighth example or any other example discussed herein, in a ninth example, the UE identifies the association of the preamble/sequence from broadcasted SI transmissions.

Further to the first example or any other example discussed herein, in a tenth example, the UE transmits the preamble/sequence in a dedicated frequency resource.

Further to the first example or any other example discussed herein, in an eleventh example, the UE transmits the preamble/sequence in a dedicated time resource.

Further to the first example or any other example discussed herein, in a twelfth example, the additional SI is received from a plurality of base station transceivers.

Further to the second example or any other example discussed herein, in a thirteenth example, the additional SI is received in a predefined time window.

Further to the first example or any other example discussed herein, in a fourteenth example, the UE checks for a broadcasted flag, wherein the flag indicates whether the transmission of the additional SI is periodic or triggered.

Further to the first example or any other example discussed herein, in a fifteenth example, the UE starts a timer upon transmission of the preamble/sequence and retransmits the preamble/sequence if the additional SI has not been decoded by the UE upon expiration of the timer.

The LOSIA method 100 may also be implemented, in a sixteenth example, by a base station (BS) occupying a radio access network in a first example, where the BS transmits a limited set of SI in a periodic manner and transmits additional SI upon receipt of one or more preamble/sequences wherein the additional SI is not continuously and periodically transmitted.

Further to the sixteenth example or any other example discussed herein, in a seventeenth example, the BS broadcasts a flag wherein the flag indicates whether the additional SI is continuously and periodically transmitted or not.

Further to the sixteenth or seventeenth examples or any other example discussed herein, in an eighteenth example, the additional SI is common to all UEs operating in the RAN.

Further to the sixteenth or seventeenth examples or any other example discussed herein, in a nineteenth example, the additional SI is specific to the UE relative to other UEs operating in the RAN.

Further to the sixteenth example or any other example discussed herein, in a twentieth example, the transmission of additional SI is associated with an identifier.

Further to the twentieth example or any other example discussed herein, in a twenty-first example, the identifier is selected from a group consisting of a common radio network temporary identifier (RNTI), a UE-specific RNTI, a UE-specific RNTI that has changed following contention resolution, an RNTI specific to a service/application, and an RNTI specific to a radio access technology (RAT).

Further to the sixteenth example or any other example discussed herein, in a twenty-second example, the BS receives a second preamble/sequence from a second UE, wherein the second preamble/sequence is identical to the preamble/sequence and performs a contention resolution procedure to distinguish the UE from the second UE.

The LOSIA method 100 may also be implemented in an article comprising a computer-readable medium comprising instructions to cause an electronic device upon execution of instructions by one or more processors of the electronic device, to realize an apparatus according to any of the preceding examples.

In a twenty-fourth example, the LOSIA method 100 may also be implemented in an apparatus of a UE comprising radio frequency circuitry coupled to one or more antennas, the antennas to receive signals transmitted over a cellular network and one or more processors to execute instructions, the instructions, once executed by the one or more processors, to cause the UE to decode a limited set of system information (SI) comprising a coarse time and frequency synchronization, a cyclic prefix length, a duplex mode, and a physical cell identifier of a cell in the cellular network, transmit a preamble/sequence to the cell using the radio frequency circuitry and the one or more antennas, wherein the preamble/sequence indicates a request for additional SI, monitor for additional SI in the cellular network, and decode the additional SI.

Further to the twenty-fourth example or any other example discussed herein, in a twenty-fifth example, the instructions of the apparatus may further start a timer upon transmission of the preamble/sequence and retransmit the preamble/sequence if the additional SI has not been decoded by the UE upon expiration of the timer.

While the foregoing examples are illustrative of the principles of one or more particular applications, it will be apparent to those of ordinary skill in the art that numerous modifications in form, usage, and details of implementation can be made without the exercise of inventive faculty, and without departing from the principles and concepts described herein. It is intended that the appended claims cover all such modifications and variations as fall within the true spirit and scope of the disclosure.

We claim:

1. A user equipment (UE) occupying a Radio Access Network (RAN), the UE comprising:
   a processor;
   memory coupled to the processor, the memory comprising instructions which, when executed by the processor, cause the processor to:
   initiate a cell search of the RAN to decode a set of system information (SI) comprising a system information block (SIB), the SIB to provide a physical random access channel (PRACH) configuration;
   transmit the PRACH comprising a preamble/sequence in a subframe to a RAN base station transceiver, wherein the PRACH comprising the preamble/sequence, when transmitted in the subframe, indicates a request for additional SI; and
   monitor for transmission of the additional SI within a window of the subframe, wherein a position and size of the window are configured in a SI information element.

2. The UE of claim 1, the UE to further:
   decode the additional SI;
   wherein the UE is thereafter able to communicate with the RAN base station.

3. The UE of claim 2, wherein the additional SI is common to all UEs operating in the RAN.

4. The UE of claim 2, wherein the additional SI is specific to the UE relative to other UEs operating in the RAN.

5. The UE of claim 1, the UE to further transmit the PRACH comprising the preamble/sequence by:
   randomly selecting the preamble/sequence from a set of preamble/sequences.

6. A user equipment (UE) occupying a Radio Access Network (RAN), the UE comprising:
   a processor;
   memory coupled to the processor, the memory comprising instructions which, when executed by the processor, cause the processor to:
   initiate a cell search of the RAN to decode a set of system information (SI) comprising a system information block (SIB), the SIB to provide a physical random access channel (PRACH) configuration;
   transmit the PRACH comprising a preamble/sequence in a subframe to a RAN base station transceiver, wherein the PRACH comprising the preamble/sequence, when transmitted in the subframe, indicates a request for additional SI; and
   monitor for transmission of the additional SI within a window of the subframe,
   wherein the PRACH comprising the preamble/sequence, when transmitted in the subframe, does not indicate:
   uplink synchronization;
   a scheduling request; or
   a radio resource control (RRC) connection setup request.

7. The UE of claim 5, wherein the preamble/sequence transmissions trigger additional SI associated with an identifier and the identifier is selected from a group consisting of a common radio network temporary identifier (RNTI), a UE-specific RNTI, a UE-specific RNTI that has changed following contention resolution, an RNTI specific to a service/application, and an RNTI specific to a radio access technology (RAT).

8. The UE of claim 1, wherein the preamble/sequence indicates a request to send the additional system information for a predetermined service or application.

9. The UE of claim 8, wherein the UE identifies the association of the preamble/sequence from broadcasted SI transmissions.

10. The UE of claim 1, wherein a position and size of the window are configured by higher layers.

11. The UE of claim 10, wherein the higher layer configuration is via a master information block.

12. The UE of claim 10, wherein the higher layer configuration is via the SIB or another SIB.

13. The UE of claim 10, wherein the higher layer configuration is via dedicated radio resource control (RRC) signaling.

14. The UE of claim 1, wherein the position and size of the window are known to the UE.

15. The UE of claim 1, wherein the position and size of the window are configured in a SI-ResponseWindowSize information element, wherein a range of 0-10 subframes is indicated.

16. A base station (BS) occupying a Radio Access Network (RAN), the BS comprising:
   a processor; and
   a memory coupled to the processor, the memory comprising instructions to enable the BS to:
   transmit a limited set of system information (SI) in a periodic manner, the limited set of SI to enable a user equipment (UE) to acquire a physical random access channel (PRACH);
   receive a preamble/sequence from the UE using the PRACH, the PRACH having been transmitted in a subframe, wherein the PRACH comprising the preamble/sequence, when transmitted in the subframe, indicates a request for additional SI; and
   transmit the additional SI within a window of the subframe, wherein a position and size of the window are configured in a SI information element;
   wherein the additional SI is not continuously and periodically transmitted.

17. The BS of claim 16, wherein the additional SI is common to all UEs operating in the RAN.

18. The BS of claim 16, wherein the additional SI is specific to the UE relative to other UEs operating in the RAN.

19. The BS of claim 16, wherein the PRACH comprising the preamble/sequence, when transmitted in the subframe, does not indicate:
   uplink synchronization;
   a scheduling request; or
   a radio resource control (RRC) connection setup request.

20. The BS of claim 16, wherein the transmission of additional SI is associated with an identifier and the identifier is selected from a group consisting of a common radio network temporary identifier (RNTI), a UE-specific RNTI, a UE-specific RNTI that has changed following contention resolution, an RNTI specific to a service/application, and an RNTI specific to a radio access technology (RAT).

21. The BS of claim 16, the memory comprising instructions to enable the BS to further:
   receive a second preamble/sequence from a second UE, wherein the second preamble/sequence is identical to the preamble/sequence; and
   perform a contention resolution procedure to distinguish the UE from the second UE.

22. An apparatus of a user equipment (UE), the apparatus comprising:
   radio frequency circuitry coupled to one or more antennas, the antennas to receive signals transmitted over a cellular network; and
   one or more processors to execute instructions, the instructions, once executed by the one or more processors, to cause the UE to:
   decode a limited set of system information (SI) comprising a coarse time and frequency synchronization, a cyclic prefix length, a duplex mode, and a physical cell identifier of a cell in the cellular network;
   transmit a preamble/sequence to the cell using the radio frequency circuitry and the one or more antennas, wherein the preamble/sequence is transmitted in a dedicated time/frequency resource of the cell and indicates a request for additional SI; and
   monitor a transmission window of the dedicated time/frequency resource for additional SI in the cellular network; and
   decode the additional SI.

23. The apparatus of claim 22, the instructions, once executed by the one or more processors to further:
   start a timer upon transmission of the preamble/sequence; and
   retransmit the preamble/sequence if the additional SI has not been decoded by the UE upon expiration of the timer.

* * * * *